(12) United States Patent
Kimura et al.

(10) Patent No.: US 8,636,621 B2
(45) Date of Patent: Jan. 28, 2014

(54) CONTROL DEVICE OF VEHICLE

(75) Inventors: Hiromichi Kimura, Okazaki (JP);
Yukihiko Ideshio, Nissin (JP); Hiroaki Ebuchi, Susono (JP); Tomohito Ono, Susono (JP); Hirotatsu Kitabatake, Susono (JP); Hideki Sano, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 201 days.

(21) Appl. No.: 13/381,714

(22) PCT Filed: Jul. 8, 2009

(86) PCT No.: PCT/JP2009/003187
§ 371 (c)(1),
(2), (4) Date: Dec. 30, 2011

(87) PCT Pub. No.: WO2011/004433
PCT Pub. Date: Jan. 13, 2011

(65) Prior Publication Data
US 2012/0103749 A1 May 3, 2012

(51) Int. Cl.
*H02P 17/00* (2006.01)
(52) U.S. Cl.
USPC .................. 477/18; 477/8; 903/918; 903/930
(58) Field of Classification Search
USPC .......... 477/5, 7, 8, 18, 83, 115; 903/906, 909, 903/918, 930; 701/51, 53, 54
See application file for complete search history.

(56) References Cited

U.S. PATENT DOCUMENTS

| 6,377,882 B1* | 4/2002 | Ito .................................... 701/51 |
| 8,290,651 B2* | 10/2012 | Park et al. ........................ 701/22 |
| 2002/0079178 A1 | 6/2002 | Takuno et al. |
| 2012/0190499 A1* | 7/2012 | Oba .............................. 477/115 |
| 2013/0017928 A1* | 1/2013 | Oh et al. ......................... 477/94 |

FOREIGN PATENT DOCUMENTS

| JP | 9-156387 | 6/1997 |
| JP | 2002-188656 | 7/2002 |
| JP | 2003-312283 | 11/2003 |
| JP | 2005-184999 | 7/2005 |
| JP | 2009-96284 | 5/2009 |

OTHER PUBLICATIONS

International Search Report in International Application No. PCT/JP2009/003187; Mailing Date: Sep. 8, 2009.
Applicant's Reply in International Application No. PCT/JP2009/003187; Receipt Date: Jun. 22, 2010.
Applicant's Amendment in International Application No. PCT/JP2009/003187; Receipt Date: Jun. 22, 2010.

* cited by examiner

*Primary Examiner* — Justin Holmes
(74) *Attorney, Agent, or Firm* — Finnegan, Henderson, Farabow, Garrett & Dunner, LLP

(57) ABSTRACT

A control device of a vehicle includes: power dividing mechanism that has a plurality of rotating elements rotated by torque output and transmitted from an engine and a first motor/generator and switches a transmission mode according to the engaging states of the respective rotating elements; and a clutch that has a first engaging member and a second engaging member having a backlash between them in a rotating direction thereof, and that sets a transmission mode to a fixed transmission ratio mode by engaging the first engaging member connected to one of the rotating elements with the second engaging member, and sets the transmission mode to a continuously variable transmission ratio mode by releasing the engagement. In the control device of a vehicle, the magnitude of the reversed rotating torque is reduced when the direction of rotating torque acting between the first and seconds engaging members.

8 Claims, 21 Drawing Sheets

CONTROL DEVICE OF VEHICLE

CROSS-REFERENCE TO RELATED APPLICATIONS

This application is a national phase application of International Application No. PCT/JP2009/003187, filed Jul. 8, 2009, the contents of which are incorporated herein by reference.

FIELD

The present invention relates to a control device for a vehicle equipped with a plurality of power sources.

BACKGROUND

Conventionally, a known hybrid vehicle includes: an engine, which is a power source; a first motor/generator (MG1) operated as a generator; a second motor/generator (MG2), which is another power source operated as a motor; a power transmitting means having a planetary gear mechanism to which the engine and the first motor/generator are connected; and a means (MG1 locking means) for stopping rotation of the first motor/generator. The power transmitting means also functions as a transmission mechanism for engine output, and is configured so as to allow switching between continuously variable transmission ratio mode, in which transmission ratio is varied continuously, and fixed transmission ratio mode, in which transmission ratio is fixed. To exert control in continuously variable transmission ratio mode, the MG1 locking means allows the first motor/generator to rotate freely, and the rotation number of the first motor/generator is controlled, thereby changing the rotation number of the engine. Conversely, to exert control in fixed transmission ratio mode, rotation of the first motor/generator is stopped by the MG1 locking means. That is, the MG1 locking means has the function of a transmission mode changing means. For example, a hybrid vehicle of this type is described in the Patent Literature 1 given below. In the hybrid vehicle in the Patent Literature 1, when the rotation number of a first motor/generator falls within a predetermined range (when the rotation number falls below a permissible rotation number value), a brake or clutch, serving as an MG1 locking means, is engaged to stop the rotation of the first motor/generator.

The Patent Literature 2 given below describes a driving device that drives the front wheels using engine output, and drives the rear wheels using from electric motor output via an electromagnetic clutch. The electromagnetic clutch has a cam mechanism. Therefore, this driving device is configured such that, in order to prevent noise emission as a result of reversed rotation of both cam members of a cam mechanism when a vehicle changes running direction forward or backward, the electromagnetic clutch is temporarily disconnected when each cam member of the cam mechanism rotates in reverse; after reverse rotation of each cam member has been unlocked, the electromagnetic clutch is connected again.

CITATION LIST

Patent Literatures

Patent Literature 1: Japanese Patent Application Laid-open No. 9-156387
Patent Literature 1: Japanese Patent Application Laid-open No. 2003-312283

SUMMARY

Technical Problem

The transmission mode changing means (MG1 locking means) is, for example, a dog clutch or the like, which includes two engaging members rotated relative to each other. This changing means rotates one engaging member relative to the other engaging member, thereby engaging them, and rotates respective engaging members integrally, thereby stopping rotation of the first motor/generator. A transmission mode changing means of this type is allowed allowance (so-called backlash) with which the engaging members are able to rotate relative to each other. By relatively rotating to the point where backlash is taken up, they become engaged with each other. In this case, in the transmission mode changing means provided with a degree of backlash, when rotating torque acting on an engaging member is reversed, the engaging members are displaced by an amount corresponding to the maximum backlash while rotating relative to each other, and thus they are engaged with each other. During engagement, this transmission mode changing means may cause shock or noise. For example, in a dog clutch, its engaging members strike against each other, which may result in shock or noise.

Accordingly, it is an object of the present invention to provide a control device of a vehicle that eliminates the foregoing drawbacks of conventional examples and that restrains or reduces shock or noise resulting from backlash taken up at the time of reversal of the direction of rotating torque acting on a rotating element of a transmission mode changing means (MG1 locking means) that has such backlash in the direction of rotation thereof.

Solution to Problem

In order to achieve the above mentioned object, a control device of a vehicle according to the present invention includes a transmission mechanism that includes a plurality of rotating elements rotated by torque output and transmitted from a plurality of power sources, and that switches a transmission mode according to engaging states of the respective rotating elements; and a transmission mode changing means that includes a first engaging member and a second engaging member having a backlash between them in a rotating direction thereof, and that alters the transmission mode to a fixed transmission ratio mode by engaging the first engaging member, connected to one of the rotating elements, with the second engaging member, and alters the transmission mode to a continuously variable transmission ratio mode by releasing the engagement, wherein when a direction of rotating torque acting between the first engaging member and the second engaging member is reversed, the magnitude of the reversed rotating torque is reduced.

Here, when the direction of the rotating torque acting between the first engaging member and the second engaging member is reversed, rotation restraining torque for reducing the magnitude of the rotating torque may be applied to the engaging member to which the reversed rotating torque is acting.

Here, the rotation restraining torque may be generated by using torque output from at least one of the power sources. Further, when a motor, a generator, or a motor/generator is provided as the power source, the rotation restraining torque may be generated using torque output from the motor, generator, or motor/generator.

In order to achieve the above mentioned object, a control device of a vehicle according to the present invention includes a transmission mechanism that includes a plurality of rotating elements rotated by torque output and transmitted from a plurality of power sources, and that switches a transmission mode according to engaging states of the respective rotating elements; and a transmission mode changing means that includes a first engaging member and a second engaging member having a backlash between them in a rotating direction thereof, and that alters the transmission mode to a fixed transmission ratio mode by engaging the first engaging member, connected to one of the rotating elements, with the second engaging member, and alters the transmission mode to a continuously variable transmission ratio mode by releasing the engagement, wherein when the transmission mode changing means includes an electromagnetic attractive force generating means that stops rotation of the second engaging means by use of electromagnetic attractive force, the rotation of the second engaging member is permitted by reducing electromagnetic attractive force generated by the electromagnetic attractive force generating means, if a direction of rotating torque applied to the first engaging member is reversed.

In order to achieve the above mentioned object, a control device of a vehicle according to the present invention includes a transmission mechanism that includes a plurality of rotating elements rotated by torque output and transmitted from a plurality of power sources, and that switches a transmission mode according to engaging states of the respective rotating elements; and a transmission mode changing means that includes a first engaging member and a second engaging member having a backlash between them in a rotating direction thereof, and that alters the transmission mode to a fixed transmission ratio mode by engaging the first engaging member, connected to one of the rotating elements, with the second engaging member, and alters the transmission mode to a continuously variable transmission ratio mode by releasing the engagement, wherein when a direction of rotating torque acting between the first engaging member and the second engaging member is reversed, rotation inhibition torque is applied to the engaging member on which the reversed rotating torque is acting, the rotation inhibition torque being in reverse direction to and greater than the reversed rotating torque.

Here, the rotation restraining torque may be generated by using torque output from at least one of the power sources. Further, when a motor, a generator, or a motor/generator is provided as the power source, the rotation restraining torque may be generated using torque output from the motor, generator, or motor/generator.

In order to achieve the above mentioned object, a control device of a vehicle according to the present invention includes a transmission mechanism that includes a plurality of rotating elements rotated by torque output and transmitted from a plurality of power sources, and that switches a transmission mode according to engaging states of the respective rotating elements; and a transmission mode changing means that includes a first engaging member and a second engaging member having a backlash between them in a rotating direction thereof, and that alters the transmission mode to a fixed transmission ratio mode by engaging the first engaging member, connected to one of the rotating elements, with the second engaging member, and alters the transmission mode to a continuously variable transmission ratio mode by releasing the engagement, wherein when a direction of rotating torque acting between the first engaging member and the second engaging member is reversed, switching among first control, second control, and third control is carried out, the first control being such that rotation restraining torque for reducing the magnitude of the rotating torque is applied to the engaging member to which reversed rotating torque is acting, according to a returning speed of an accelerator pedal or deceleration of an accelerator opening degree, the second control being such that, when the reversed rotating torque is acting on the first engaging member, rotation of the second engaging member is permitted by reducing electromagnetic attractive force of an electromagnetic attractive force generating means that stops rotation of the second engaging member, the third control being such that rotation inhibiting torque in reverse direction to and greater than the rotating torque is applied to the engaging member to which the reversed rotating torque is acting.

Here, the third control may be exerted when the returning speed of the accelerator pedal or the deceleration of the accelerator opening degree is greater than a threshold value, and the first or second control may be exerted when a predetermined time has elapsed without the accelerator pedal being pressed after that or when the braking operation is carried out.

Advantageous Effects of Invention

In a control device of a vehicle according to present invention, a transmission mode changing means for switching between a fixed transmission ratio mode and a continuously variable transmission ratio mode has a backlash in a rotating direction. When the direction of rotating torque acting on a rotating element of the transmission mode changing means (a first engaging member or second engaging member) is reversed, rotation restraining torque for reducing the rotating torque is applied to the engaging member to which the reversed rotating torque is acting, thereby reducing the magnitude of the reversed torque. Therefore, since this control device takes up the backlash gently, it is able to restrain or reduce shock or noise that may occur as a result of taking up the backlash. Additionally, when such reversal of the direction of rotating torque occurs, the control device of a vehicle according to the present invention applies rotation inhibiting torque in reverse direction to and greater than the reversed rotating torque to the engaging member to which the reversed rotating torque is acting. Therefore, since the control device maintains a state exhibited before the reversal without taking up the backlash, it is able to restrain or reduce shock or noise that may occur as a result of taking up the backlash. The control device of a vehicle according to the present invention permits rotation of the second engaging member by reducing electromagnetic attractive force of an electromagnetic attractive force generating means provided to shop rotation of the second engaging member when the inverted rotating torque is acting on the first engaging member. Hence, this control device is able to rotate the second engaging member by virtue of the rotating torque of the first engaging member. Therefore, this control device is able to rotate the second engaging member by virtue of the rotating torque of the first engaging member when the backlash takes up as a result of the reversal of the direction of the rotating toque. Accordingly, force applied to the second engaging member by rotating torque of the first engaging member is released, thus restraining or reducing occurrences of shock and noise.

DESCRIPTION OF EMBODIMENTS

A control device of a vehicle according to embodiments of the present invention will be described below in detail with reference to the attached drawings. It is noted that this invention is not limited to these embodiments.

Embodiments

First Embodiment

The control device of a vehicle according to the first embodiment of the present invention will be described with reference to FIGS. 1 to 12.

In the description below, a hybrid vehicle is used as an example of a vehicle to be controlled by the control device. This hybrid vehicle includes: an engine as a power source; a first motor/generator (MG1) operated as a generator, a second motor/generator (MG2) as another power source operated as a motor; a power transmitting means having a planetary gear mechanism to which the engine and the first motor/generator are connected; and an MG1 locking means for stopping rotation of the first motor/generator. In this hybrid vehicle, the power transmitting means also functions as a transmitting mechanism for engine output. This power transmitting means is configured so as to switch between a continuously variable transmission ratio mode in which the rotation number of the first motor/generator is controlled to change the rotation number of the engine, thereby continuously varying the transmission ratio and a fixed transmission ratio mode in which rotation of the first motor/generator is stopped by the MG1 locking means. A detailed example of this hybrid vehicle will now be described.

Figure 1:
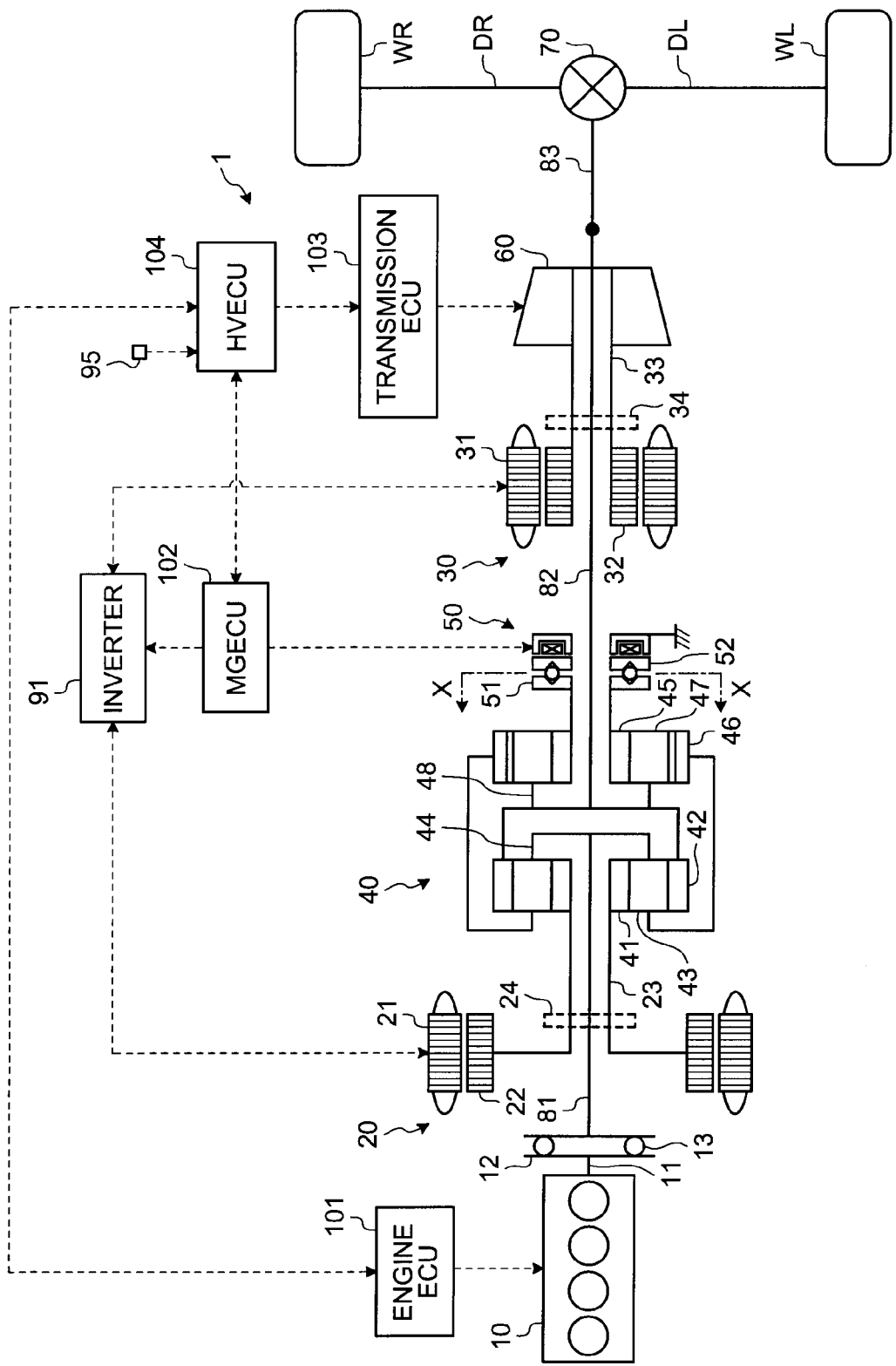
FIG. 1 is a diagram illustrating an example of a vehicle in which a control device of a vehicle according to the present invention is applied.

As shown in FIG. 1, a hybrid vehicle 1 exemplified in this description is provided with an engine 10, a first motor/generator (MG1) 20, and a second motor/generator (MG2) 30. Additionally, this hybrid vehicle 1 includes: a power dividing mechanism 40 with the above-mentioned planetary gear mechanism; a clutch 50 functioning as an MG1 locking means (a transmission mode changing means), a transmitting means for a second motor/generator 30 (hereinafter referred to as "an MG2 transmitting means") 60; and a final speed reducer 70 with a differential mechanism. In this case, the power dividing mechanism 40, the clutch 50, the MG2 transmitting means 60, and the final speed reducer 70 with the differential mechanism are used as power transmitting means.

The engine 10 is a heat engine, such as an internal combustion engine that burns fuel within a combustion chamber and converts the thus generated thermal energy into mechanical energy. The engine 10 outputs mechanical power from an output shaft (crankshaft) 11 by the reciprocal motion of a piston, not shown. One end of the output shaft 11 is connected to a flywheel 12, which is connected to an input shaft 81 of the power transmitting means via a damper mechanism 13. The input shaft 81 is connected to the power dividing mechanism 40, to which torque output from the engine 10 (engine torque) is transmitted.

The power dividing mechanism 40 distributes the output torque from the engine 10 to the first motor/generator 20 and to an output shaft 82 of the power transmitting means, and performs a differential operation among these three. This power dividing mechanism 40 also functions as a transmitting mechanism, which switches between the continuously variable transmission ratio mode and the fixed transmission ratio mode. This power dividing mechanism 40 will be described in detail below, together with the clutch 50.

For example, in the case of an FR (Front engine Rear drive) vehicle, the output shaft 82 is connected to the final speed reducer 70 via a propeller shaft 83. This final speed reducer 70 is connected to left and right drive shafts DL and DR via an internal differential mechanism, and further to left and right wheels WL and WR (driving wheels) via the drive shafts DL and DR. Accordingly, power (rotating torque) output from the output shaft 82 is decelerated at the final reduction gear ratio of the final speed reducer 70 and distributed to the left and right drive shafts DL and DR, and thus transmitted to the driving wheels WL and WR as driving force.

The engine 10 is provided with an electronically controlled throttle device, a fuel injector, an ignition device, etc., the operations of which are controlled by an engine ECU 101 serving as an electronic control unit for the engine 10. The engine ECU 101 includes: a CPU (Central Processing Unit), ROM (Read Only Memory) storing in advance, for example, a predetermined engine control program such as for combustion control, RAM (Random Access Memory) for temporarily storing the operation results of the CPU, backup RAM for storing prepared information etc., all of which are not shown. For example, an engine control means provided in the engine ECU 101 controls the throttle device such that this device opens the throttle to a degree corresponding to the degree that a driver performs acceleration. The engine control means also controls the amount of fuel injected by the fuel injector together with the timing of this fuel injection, the timing of ignition by the ignition device, etc., thereby adjusting the magnitude of torque output from the output shaft 11 of the engine 10. In the case where the engine 10 includes a driving device for electronic control type intake and exhaust valves, not shown, the engine control means adjusts the magnitude of output torque by controlling opening/closing timing and controlling the degree to which the intake/exhaust valves are lifted.

The first motor/generator 20 and the second motor/generator 30 each comprises, for example, an AC synchronous motor of permanent magnet type. The first and second motors/generators 20 and 30 include: stators 21 and 31, respectively, which are supplied with three-phase AC power by an inverter 91; and rotors 22 and 32, respectively, as rotating members, which rotate by attraction to the rotating magnetic field of stators 21 and 31. Connected to the rotors 22 and 32 are rotary shafts 23 and 33 integrally rotated around a common axis. These first and second motors/generators 20 and 30 are connected to secondary batteries, not shown, via the inverter 91, and supply/receive power to/from the secondary batteries.

The inverter 91 is configured to convert DC power from the secondary batteries into AC power and supply it to the first and second motors/generators 20 and 30. The first and second motors/generators 20 and 30 are supplied with the AC power, thereby operating as motors and outputting mechanical power (motor torque (i.e., power running torque)) from the rotary shafts 23 and 33 of the rotors 22 and 32 respectively.

Upon input of rotating torque to the rotary shafts 23 and 33 of the rotors 22 and 32, each of the first and second motors/generators 20 and 30 converts the input torque into AC power. That is, upon input of rotating torque, the first and second motors/generators 20 and 30 operate as generators. In this case, the inverter 91 receives AC power generated as a result of the conversion made by the first and second motors/generators 20 and 30, converts this AC power into DC power, and restores this DC power into the secondary battery (that is, regeneration of power is performed).

The operation of the inverter 91 is controlled by a motor/generator ECU (hereinafter referred to as "MGECU") 102, which is an electronic control device for the first and second motors/generators 20 and 30. Specifically, the first and second motors/generators 20 and 30 are configured such that a motor/generator control means provided in the MGECU 102 controls the operation of the inverter 91, thereby controlling power or regeneration and hence controlling power running torque or regenerative torque. The MGECU 102 includes, for example, corresponding CPUs (Central Processing Units), ROM storing in advance predetermined programs such as one that determines which one of the motors and generators is used to operate each of the first and second motors/generators 20 and 30, RAM for temporarily storing the operation results of the CPU, backup RAM for storing prepared information, etc, all of which are not shown.

These first and second motors/generators 20 and 30 are provided with rotation sensors (resolvers 24 and 34) for detecting the respective rotation angles of the rotors 22 and 32. The resolvers 24 and 34 transmit detection signals to the MGECU 102 (not shown).

In the first motor/generator 20, its rotary shaft 23 is connected to a sun gear 41, described below, which is provided in the power dividing mechanism 40. The rotary shaft 23 is disposed so as to be concentric with the input shaft 81. This rotary shaft 23 is a hollow shaft in which the input shaft 81 is medially disposed so as to be rotatable relative to the rotary shaft 23. The first motor/generator 20 operates as a generator by virtue of some of the torque output from the engine 10, which has been distributed by the power dividing mechanism 40. Some of the output torque is input to the rotary shaft 23 via the sun gear 41 of the power dividing mechanism 40. Subsequently, the first motor/generator 20 converts this into input torque AC power and transmits this power to the inverter 91. The AC power may be restored to the secondary battery or used directly as power to operate the second motor/generator 30 as a motor.

Since the power dividing mechanism 40 performs a differential operation, the rotation number of the engine 10 can be continuously changed by controlling the rotation number of the first motor/generator 20. As a result, the power dividing mechanism 40 is shifted to a continuously variable transmission ratio mode, and the torque output by the engine 10 is continuously changed in speed and distributed to the output shaft 82. The MGECU 102 detects the rotation number of the first motor/generator 20 based on a detection signal from the resolver 24 and controls this rotation number via the inverter 91.

Additionally, the first motor/generator 20 can also be used as a motor for starting the engine 10. In this case, the motor torque from the first motor/generator 20 is transmitted to the output shaft 11 of the engine 10 via the power dividing mechanism 40.

The first motor/generator 20 mainly functions as a generator that uses some of thee power of the engine 10, as described above. However, in addition to this, the first motor/generator 20 can function as a power source that supplies generated power to the second motor/generator 30 or can function as a motor for starting the engine 10.

The second motor/generator 30 is used for aiding the driving or braking forces. The rotary shaft 33 of the second motor/generator 30 is disposed concentrically with the output shaft 82. This rotary shaft 33 is a hollow shaft in which the output shaft 82 is medially disposed so as to be rotatable relative to the rotary shaft 33.

For example, when using the output torque from the engine 10 only is insufficient for driving the vehicle, the second motor/generator 30 is supplied, via the inverter 91, with power from the secondary battery or power generated by the first motor/generator 20, and is operated as a motor, thereby compensating for this insufficiency. The motor torque from this second motor/generator 30 is supplied to the output shaft 82 via the MG2 transmitting means 60. The MGECU 102 detects the rotation number of the second motor/generator 30 based on the signal detected by the resolver 34, and controls the rotation number via the inverter 91, thereby generating driving force corresponding to the insufficiency.

When a brake is applied to decelerate or stop the vehicle, rotating torque is input to the rotary shaft 33 of the second motor/generator 30 from each driving wheel WL, WR via the MG2 transmitting means 60. The input torque is converted into AC power by the second motor/generator 30 operating as a generator, and this AC power is supplied to the inverter 91.

At this time, power regeneration is carried out as described above, and braking force (regenerative braking force) is also added to the driving wheels WL and WR, thereby regeneratively braking the vehicle.

The MG2 transmitting means 60 is a reduction mechanism of two stage transmission system, in which switching takes place between high and low gear speeds. This MG2 transmitting means 60 includes the following components, which are however not shown: a first sun gear, serving as an external gear, disposed concentrically with the output shaft 82 and with the rotary shaft 33 of the second motor/generator 30; a second sun gear, as an external gear, greater than the first sun gear in diameter, and disposed concentrically with the first sun gear so as to be displaced in the forward and backward directions of the vehicle; a ring gear, as an internal gear, disposed concentrically with the first sun gear; a plurality of short pinion gears engaging with the first sun gear; a plurality of long pinion gears engaging with the ring gear as well as the second sun gear and short pinion gears; and a carrier holding each short pinion gear and long pinion gear so that they are free to rotate around their own axes and revolve around the sun gears. This MG2 transmitting means 60 is configured as a planetary gear mechanism that applies a differential action using, as rotating elements, the first and second sun gears and the carrier.

This MG2 transmitting means 60 is provided with a first brake that permits or restrains rotation of the first sun gear relative to the rotary shaft 33 of the second motor/generator 30, and a second brake that permits or restrains rotation of the ring gear. For use as first and second brakes, a friction engagement device, such as a multiple disk clutch, operated by hydraulic pressure, is used. In the MG2 transmitting means 60, the operations of the first and second brakes are controlled thereby to switch between high and low gear speeds. These first and second brakes are controlled by a transmission ECU 103, which is an electronic control device for the MG2 transmitting means. The transmission ECU 103 includes, for example: a CPU (Central Processing Unit); ROM storing a predetermined transmission control program, etc., in advance; RAM for temporarily storing the operation result/results of the CPU; and backup RAM storing prepared information, etc., (none of which are shown). A transmission control means provided for the transmission ECU 103 selects a gear speed based on prepared map data (a transmission line diagram). The map data is set such that a low gear speed is selected until the vehicles reaches a predetermined speed after the vehicle has started moving, and then switches to a high gear speed when the vehicle exceeds the predetermined vehicle speed.

The power dividing mechanism 40 includes two planetary gear mechanisms. The first planetary gear mechanism includes: the sun gear 41, serving as an external gear, disposed concentrically with the input shaft 81 and with the rotary shaft 23 of the first motor/generator 20; a ring gear 42, as an internal gear, disposed concentrically with the sun gear 41; a plurality of pinion gears 43 engaging with the sun gear 41 and the ring gear 42; and a carrier 44 holding the pinion gears 43 so that each pinion gear 43 is free to rotate around its own axis and revolve around the sun gear. The second planetary gear mechanism includes: a sun gear 45, as an external gear, disposed concentrically with the output shaft 82; a ring gear 46, as an internal gear, disposed concentrically with the sun gear 45; a plurality of pinion gears 47 engaging with the sun gear 45 and the ring gear 46; and a carrier 48 holding the pinion gears 47 so that each pinion gear 47 is free to rotate around its own axis and revolve around the sun gear.

The input shaft 81 is connected to the carrier 44 of the first planetary gear mechanism. Further, each pinion gear 43 held by this carrier 44 is connected to the ring gear 46 of the second planetary gear mechanism. In this case, the input shaft 81, the carrier 44, the pinion gear 43, and the ring gear 46 constitute the first rotating element of four rotating elements. The four rotating elements rotate by means of driving control torque from the power source (torque output from the engine 10 and the first motor/generator 20) transmitted thereto.

The rotary shaft 23 of the first motor/generator 20 is connected to the sun gear 41 of the first planetary gear mechanism. In this case, the sun gear 41 and the rotor 22 of the first motor/generator 20 constitute the second rotating element.

The ring gear 42 of the first planetary gear mechanism is connected to the carrier 48 of the second planetary gear mechanism. Further, the output shaft 82 is connected to the ring gear 42 and the carrier 48. In this case, the ring gear 42, the carrier 48, and the output shaft 82 constitute the third rotating element.

The sun gear 45 of the second planetary gear mechanism is connected to the clutch 50. This sun gear 45 constitutes the fourth rotating element.

The clutch 50 will now be described. This clutch 50 functions as an actuator that switches a transmission mode for a transmission mechanism (the power dividing mechanism 40). This clutch 50 switches the transmission mode to a fixed transmission ratio mode by its being brought into a clutch engaged state, which is described below, and to a continuously variable transmission ratio mode by its being brought into a clutch released state, which is also described below.

Figure 2:
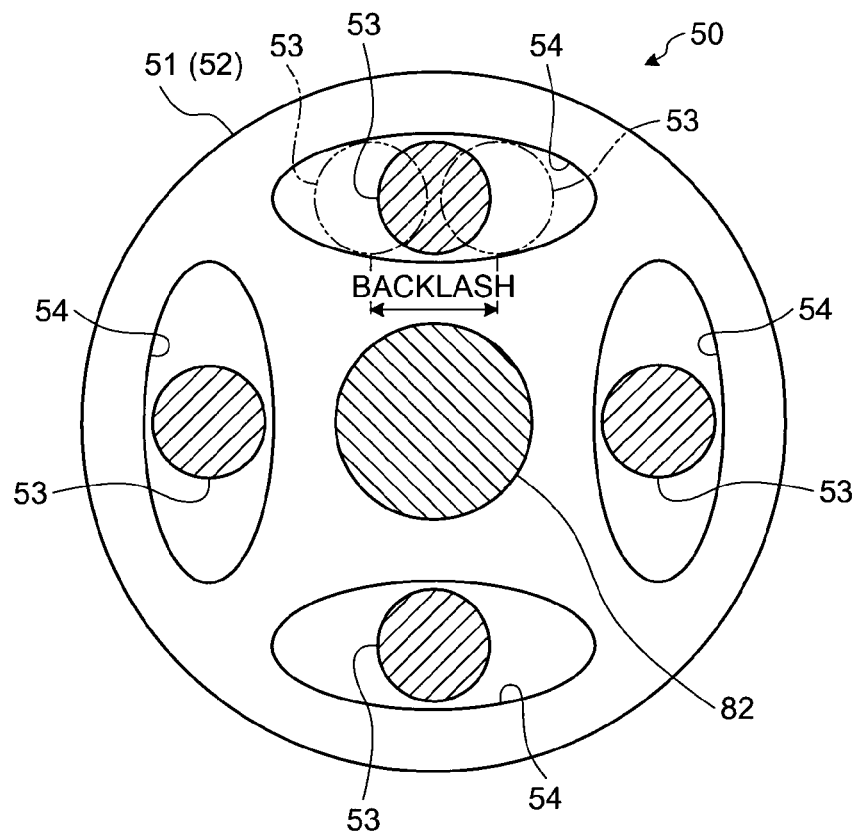
FIG. 2 is a cross-sectional view of an electromagnetic cam clutch taken along the line X-X of FIG. 1.
Figure 3:
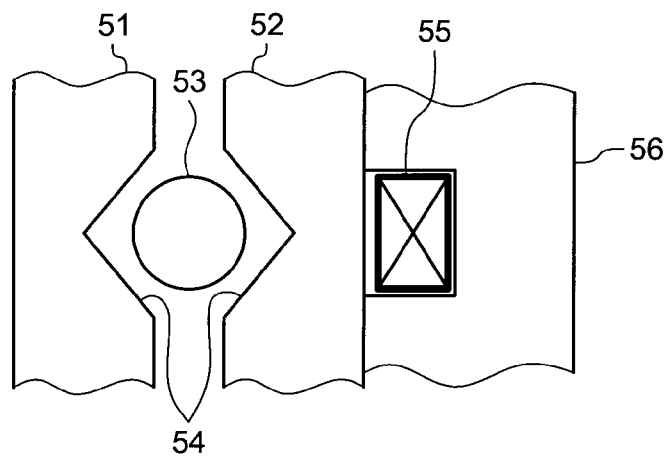
FIG. 3 is a diagram illustrating the main portion of the electromagnetic cam clutch.

The clutch 50 exemplified here is an electromagnetic clutch with a cam mechanism, and is a so-called electromagnetic cam clutch that is brought into a clutch engaged state or released state by supply or non-supply of power to a magnetic coil. As shown in FIGS. 2 and 3, this clutch 50 includes: first and second engaging members 51 and 52 having annular portion, as a pair which are disposed such that planar surfaces face each other and rotate relative to each other; and a plurality of cams 53 formed from spherical bodies disposed between these first and second engaging members 51 and 52. This clutch 50 may use the output shaft 82 as its rotary shaft by virtue of its disposal on the output shaft 82. FIG. 2 is a cross-sectional view of the clutch 50 taken along the line X-X of FIG. 1. FIG. 3 is a schematic view of part of the main portion of the clutch 50.

The first engaging member 51 is connected to the sun gear 45 of the second planetary gear, which serves as the fourth rotating element, and rotates integrally with the sun gear 45. Additionally, this first engaging member 51 is able to rotate relative to the output shaft 82. The second engaging member 52 is also able to rotate relative to the output shaft 82.

Figure 4:
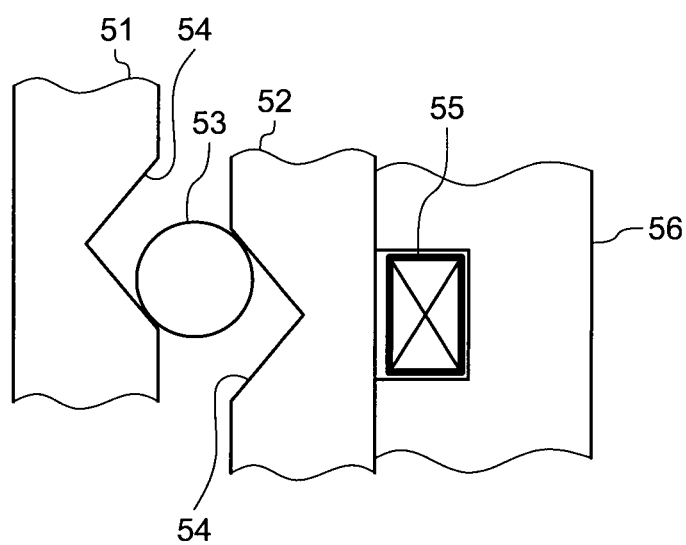
FIG. 4 is a diagram illustrating an operating form of the electromagnetic cam clutch.
Figure 5:
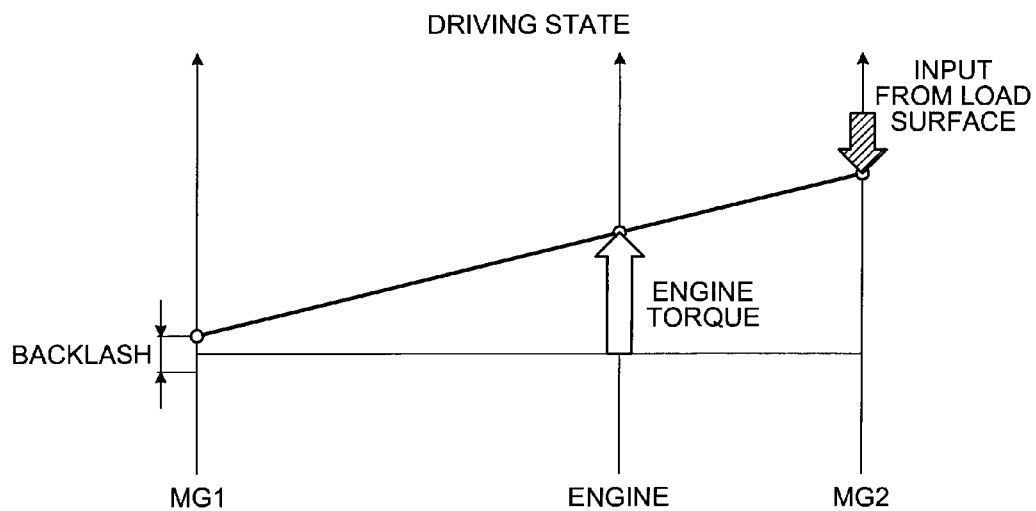
FIG. 5 is a collinear diagram for an engine in a driving state, a first motor/generator, and a second motor/generator.
Figure 6:
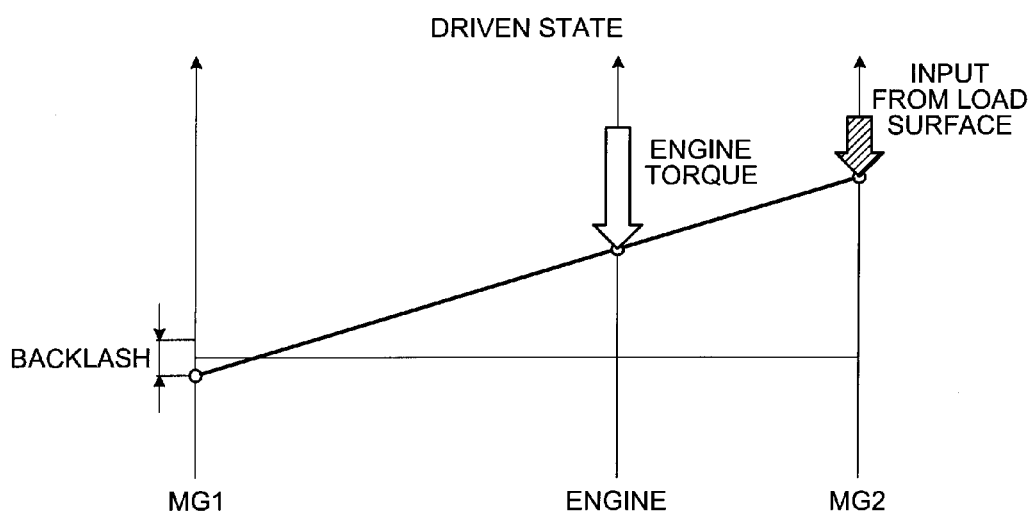
FIG. 6 is a collinear diagram for an engine in a driven state, the first motor/generator, and the second motor/generator.

In this case, in the first and second engaging members 51 and 52, a plurality of cam grooves 54 matching the number of cams 53 are formed in the opposite annular planar surfaces. The cam 53 is held so as to be movable between the respective cam grooves 54 of the first and second engaging members 51 and 52. When relative rotation takes place between the first and second engaging members 51 and 52, the cam 53 is sandwiched between the cam grooves 54, as shown in FIG. 4.

For example, it is supposed that the first engaging member 51 rotates relative to the output shaft 82 while the second engaging member 52 is stopped so as to freely rotate relative to this output shaft 82. In this case, the first engaging member 51 rotates relative to the second engaging member 52, and the cam 53 is sandwiched between the cam grooves 54. Consequently, in this clutch 50, the first engaging member 51 is locked to the second engaging member 52 via each cam 53, and the second engaging member 52 rotates integrally with the first engaging member 51. In addition, for example, if the direction of rotation of the sun gear 45 changes in this state, and the first engaging member 51 rotates in the reverse direction, the first and second engaging members 51 and 52 become unlocked, and rotate relative to each other in reverse direction to that in the foregoing case. As a result, in this clutch 50, the cam 53 is sandwiched between the cam grooves 54 in the reverse position to that in the foregoing case, and hence the first and second engaging members 51 and 52 integrally rotate in the reverse direction.

In this clutch 50, the state in which the first and second engaging members 51 and 52 are integrated via the cam 53 and rotate relative to the casing, not shown, is referred to as "a clutch released state (clutch disengaged state)." Compared to this, the state in which the rotation of the integrated first and second engaging members 51 and 52 is stopped relative to the casing is referred to as "a clutch engaged state."

This clutch 50 has an electromagnetic coil 55, shown in FIG. 3, which is actuated to switch the transmission mode to the continuously variable transmission ratio mode or fixed transmission ratio mode, as described above. Supplying power to this electromagnetic coil 55 brings about a clutch engaged state, whereas not supplying power to this electromagnetic coil 55 brings about a clutch released state. This electromagnetic coil 55 is disposed opposite the cam groove 54 of the second engaging member 52 so as to be rotatable relative to the second engaging member 52. This electromagnetic coil 55 is embedded in a holding means 56 that has an annular portion concentric with the output shaft 82. The electromagnetic coil 55 generates an electromagnetic field when supplied with power, thereby attracting the second engaging member 52 and holding it on the holding means 56. Since the holding means 56 is fixed to the internal wall of the casing, the rotation of the integrated first and second engaging members 51 and 52 stops, with the result that, relative to the casing, rotation of the sun gear 45, connected to the first engaging member 51, stops. Specifically, the electromagnetic coil 55 and the holding means 56 function as a brake for the clutch 50. Supply or non-supply of power to this electromagnetic coil 55 is controlled by the MGECU 102.

To set the continuously variable transmission ratio mode, the MGECU 102 does not supply power to the electromagnetic coil 55, thereby putting the clutch 50 into a clutch released state. At this time, in the first planetary gear mechanism of the power dividing mechanism 40, the torque output from the engine 10 acts on the carrier 44, and also torque generated by the first motor/generator 20 in reverse direction to that of the engine 10 (hereinafter referred to as "reaction torque") acts on the sun gear 41. Consequently, the ring gear 42 rotates in the same direction as the engine 10. Accordingly, the output shaft 82 rotates in the same direction as the engine 10 and, since the clutch 50 is in the clutch released state, the sun gear 45 of the second planetary gear mechanism also rotates in the same direction as the engine 10. Therefore, controlling the rotation number of the first motor/generator 20 enables changing of the rotation number of the engine 10, and hence allows continuously variable transmission.

In this continuously variable transmission ratio mode, since a continuously variable transmission state is brought about by adjusting the rotation number of the first motor/generator 20, electrical efficiency may decrease, for example, during steady operation at high-speed. In order to eliminate such a drawback, the transmission mode may be switched to the fixed transmission ratio mode by mechanically stopping the rotation of the first motor/generator 20.

To set the fixed transmission ratio, the MGECU 102 supplies power to the electromagnetic coil 55, thereby putting the clutch 50 into a clutch engaged state. As a result, the sun gear 45 of the secondary planetary gear mechanism is fixed. Therefore, in the power dividing mechanism 40, reaction torque acts on the rotation of each rotating element made by the torque output from the engine 10. At this time, as a result of fixing the sun gear 45, the rotation of the first motor/generator 20 is stopped, and the transmission ratio determined by the power dividing mechanism 40 is fixed.

The first embodiment is provided with an integrating ECU (hereinafter referred to as "HVECU") for integrally controlling the engine ECU 101, the MGECU 102, and the transmission ECU 103, which constitute the vehicle control device.

An HVECU 104 includes: a CPU (Central Processing Unit), not shown, ROM storing in advance a predetermined control program, etc., RAM for temporarily storing the operation results of the CPU, backup RAM for storing prepared information, etc. This HVECU 104 transmits or receives control instructions, values required for control, the detection signals of various sensors to or from the engine ECU 101, the MGECU 102, and the transmission ECU 103, thereby exerting vehicle driving force control or vehicle braking force control, transmission control, etc.

Incidentally, when a driver has stopped performing an acceleration by separating his or her foot from the accelerator pedal (accelerator opening degree is zero), the vehicle may switch from a driving to a driven state after the vehicle starts coast running. Alternatively, when a driver performs acceleration by pressing the accelerator pedal with his or her foot from coast running (that is, when a chip-in operation is performed), the vehicle may be switched from a driven to a driving state.

The driving state here refers to a state in which vehicle driving torque acting on the driving wheels WL and WR resulting from the output of the driving source is greater than resistant torque applied by the road surface, such as a state in which the engine torque is greater than the rotating torque applied to the output shaft 11 by resistant torque. In the description below, engine torque in this state is referred to as positive engine torque. On the other hand, the driven state refers to a state in which the vehicle driving torque is less than resistant torque applied by a road surface, such as a state in which rotating torque applied to the output shaft 11 by resistant torque is greater than engine torque. In the description below, engine torque in this state is referred to as negative engine torque. Specifically, switching from a driving to a driven state refers to the state in which the engine torque changes from a positive to a negative state (from the state in FIG. 5 to the state in FIG. 6). Conversely, switching from a driven to a driving state refers to the state in which the engine torque changes from a negative state to a positive state (from the state in FIG. 6 to the state in FIG. 5).

In the hybrid vehicle 1 exemplified in this disclosure, when switching takes place from a driving to a driven state or from a driven to a driving state, the direction of rotating torque acting on the sun gear 45 of the second planetary gear mechanism reverses, and rotating torque acting on the first engaging member 51 of the clutch 50 connected to the sun gear 45 also reverses.

In this case, since the clutch 50 in the first embodiment adopts the cam mechanism described above, the cam 53 is able to rotate in a circumferential direction around the rotary shaft of the clutch 50, within the cam groove 54, until the first and second engaging members 51 and 52 are locked together via the cam 53. That is, in this clutch 50, the distance of movement of the cam 53 is provided as allowance (i.e., backlash shown in FIG. 2). In other words, this clutch 50 suffers backlash in the rotating direction between the first and second engaging members 51 and 52, specifically, among the first engaging member 51, the second engaging member 52, and the cam 53. By virtue of this, when switching takes place from a driving to a driven state or from a driven to a driving state, the first engaging member 51 moves relative to the second engaging member 52 together with the sun gear 45 reversed in the direction of rotating torque. In conjunction with this, the cam 53 also starts to move, and hence the backlash takes up. In this clutch 50, as backlash takes up, the first engaging member 51, the cam 53, and the second engaging member 52 finally come into contact with one another. Consequently, relative rotation between the first and second engaging members 51 and 52 halts via the cam 53 again. At this time, the first motor/generator (MG1) 20 also rotates by an amount corresponding to the backlash as the sun gear 45 rotates (from the state in FIG. 5 to that in FIG. 6 or from the state in FIG. 6 to that in FIG. 5).

Switching between a driving and driven state is an operation intentionally performed by a driver, namely, an acceleration. Therefore, switching between them may occur even in the fixed transmission ratio mode in which the clutch 50 is in a clutch engaged state and the second engaging member 52 is fixed to the casing via the electromagnetic coil 55 and the holding means 56. Accordingly, in this clutch 50, when the first engaging member 51, the cam 53, and the second engaging member 52 strike against one another (when a so-called backlash strike occurs), pressure acting on the second engaging member cannot be released from the first engaging member 51 and the cam 53, possibly resulting in shock or noise. Shock resulting from torque change when switching takes place from a driven to a driving state as a result of a chip-in operation is generally called chip-in shock.

The first embodiment is provided with a backlash strike restraining means and a backlash restraint control means, for restraining backlash strike by gradually taking up the backlash and allowing gentle contact of the first engaging member 51, the cam 53, and the second engaging member 52.

Backlash Strike Restraining Control While Coast Running

First, a description is given of the backlash strike restraining control exerted during coast running in the fixed transmission ratio mode.

Figure 7:
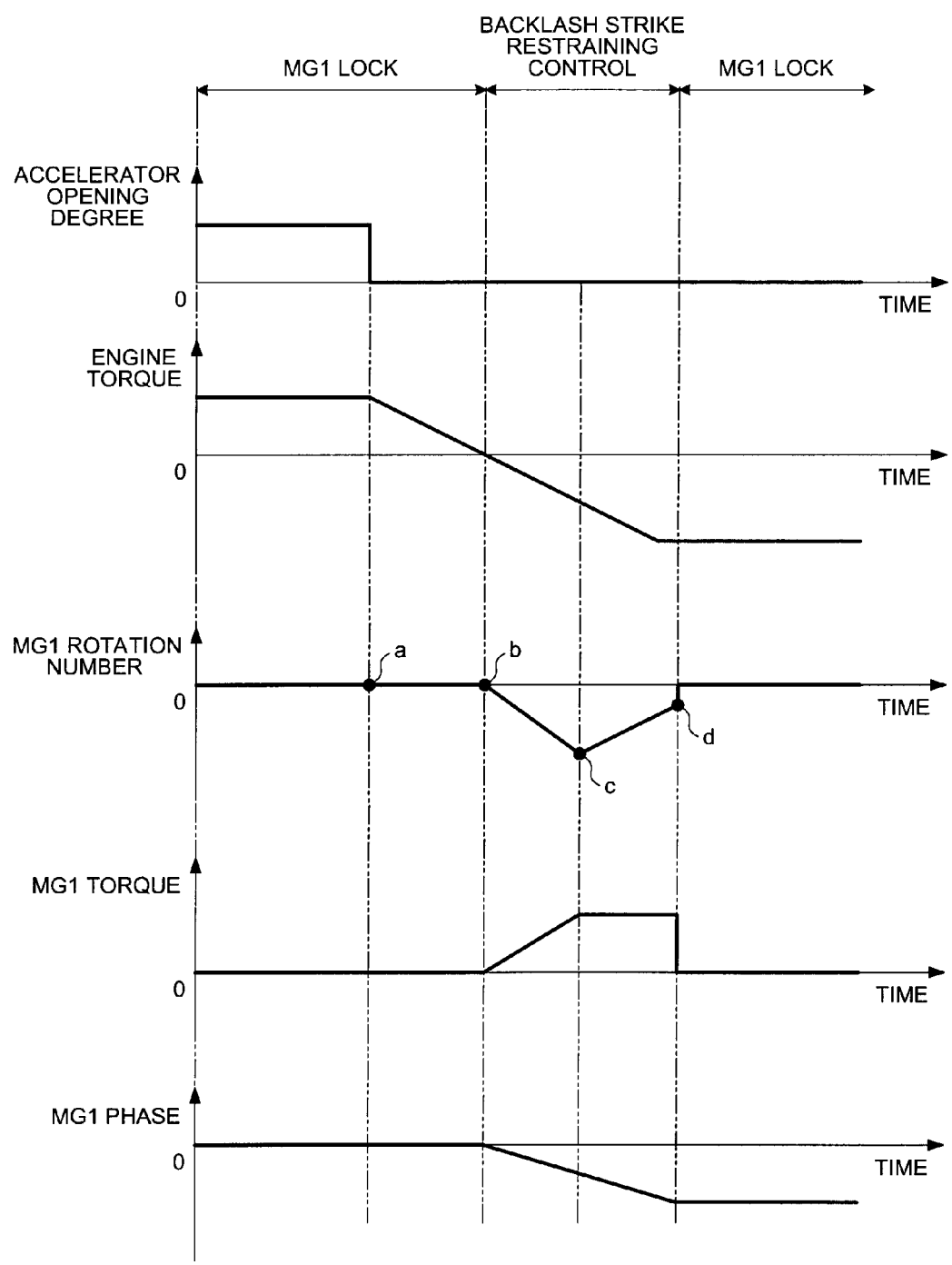
FIG. 7 is an example of a time chart for backlash strike restraining control while coast running, according to a first embodiment.

When a driver is performing acceleration in the fixed transmission ratio mode, the engine torque is in a positive state as shown in the time chart in FIG. 7. In the first motor/generator 20 in this case, the clutch 50 is in a clutch engaged state such that rotation is stopped in an MG1 lock state (MG1 rotation number is zero) and the rotary torque (MG1 torque) is zero. In addition, since this first motor/generator 20 is not rotated, there is no change in phase (MG1 phase) in the rotating direction.

When the driver stops accelerating (accelerator opening degree is zero) in such a state, engine torque decreases and coast running occurs. However, when accelerating is stopped, the engine torque is still in a positive state. Therefore, there is no change in rotating torque acting on the sun gear 45 and the first engaging member 51, and the state of the clutch 50 is barely different from that exhibited when acceleration is being performed (see the top drawing in FIG. 8). In addition, since the transmission mode at this time is also still in the fixed transmission ratio mode, the MG1 rotation number, MG1 torque, and MG1 phase are all zero in the first motor/generator 20. The state shown in the top drawing in FIG. 8 continues until the engine torque becomes zero, that is, until immediately before a change occurs from a driving to a driven state. Strictly speaking, the rotating torque acing on the first engaging member 51 decreases in the same direction as the engine torque decreases.

Figure 8:
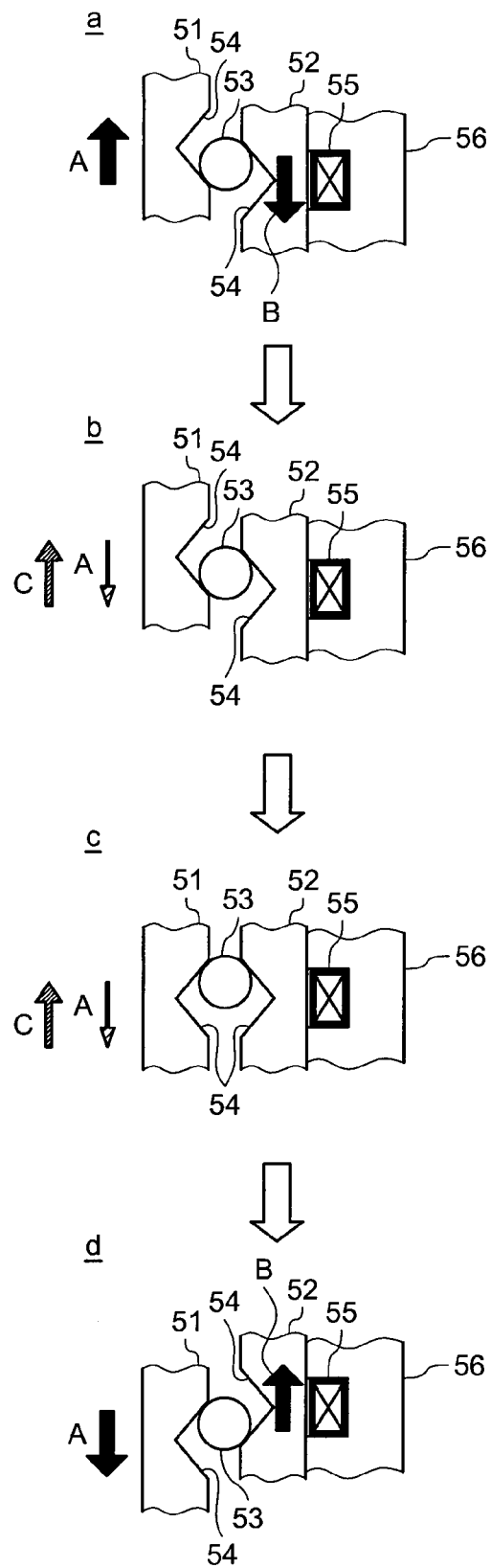
FIG. 8 is a diagram illustrating the states of the clutch in the backlash strike restraining control while coast running, according to the first embodiment.
Figure 9:
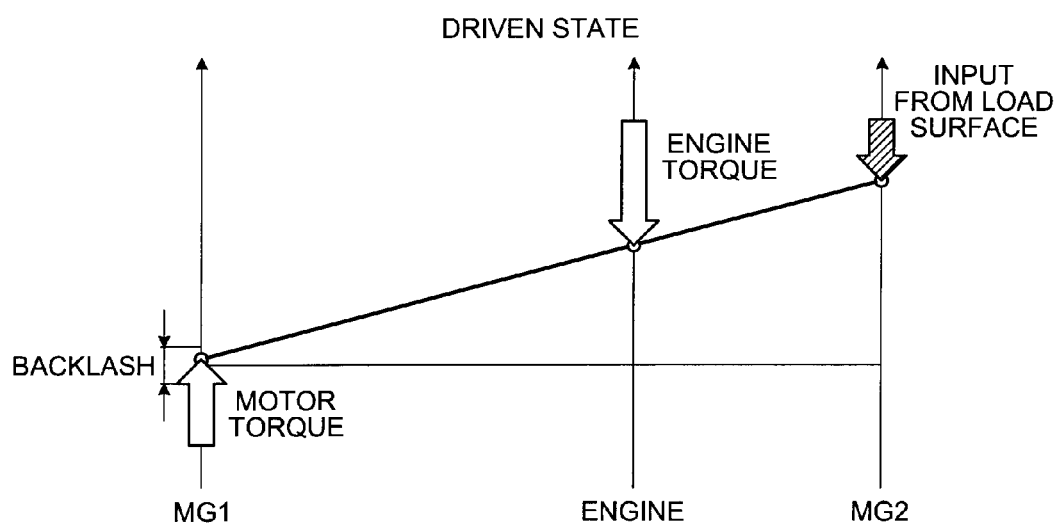
FIG. 9 is a collinear diagram representing a driven state during backlash strike restraining control while coast running, according to the first embodiment.

In FIG. 8, each arrow A indicates the direction of rotating torque acting on the first engaging member 51, and the arrow B indicates the direction of the rotating torque acting on the second engaging member 52. In FIG. 8, the narrower the arrow A, the less the rotating torque acting on the first engaging member 51. The arrow C in FIG. 8 represents backlash strike restraint rotating torque Tcmg 1 described below. The drawings a to d in FIG. 8 show the states of clutch 50 in time series, and correspond to drawings a to d in FIG. 7., respectively.

When the engine torque changes from a positive to a negative state (i.e., when change occurs from a driving to a driven state) while coast running, the direction of the rotating torque acting on the sun gear 45 and the first engaging member 51 reverses. If this state continues, the rotating torque acting on the first engaging member 51 increases according to the change in negative engine torque, which may result in backlash strike. To overcome this drawback, a backlash strike restraining means is provided for restraining occurrence of backlash strike by decreasing the rotating torque without changing the reversed direction of the rotating torque acting on the first engaging member 51, thereby gradually taking up the backlash.

The backlash strike restraining means is for applying rotation restraining torque (hereinafter referred to as "backlash strike restraint rotating torque") Tcmg 1 to the first engaging member 51 according to engine torque and resistant torque applied by a road surface, the rotation restraining torque being against, in reverse direction to, and smaller in absolute value than, the reversed rotating torque acting on the first engaging member 51.

The backlash strike restraint rotating torque Tcmg 1 can be found from the equation 1 given below, based on rotating torque Tceng acting on the first engaging member 51 resulting from rotating torque Tctgt and engine torque, and based on rotating torque Tcr acting on the first engaging member 51 resulting from resistant torque by a road surface, the rotating torque Tctgt acting on the first engaging member 51 being able to restrain backlash and having been found from an experiment or simulation in advance. The rotating torque Tceng resulting from engine torque may be found based on the actual, estimated, or required engine torque and the gear ratio of the power dividing mechanism 40. In addition, the rotating torque Tcr resulting from resistant torque by the road surface may be found based on the speed or the number of rotations of the driving wheels WL and WR, the final speed reduction ratio of the final speed reducer 70, and the gear ratio of the power dividing mechanism 40.

$$|Tcmg\,1|=|Tcr|-|Tceng|-Tctgt| \qquad (1)$$

The magnitude of this backlash strike restraint rotating torque Tcmg 1 may be set to a fixed value in advance if this value is able to restrain backlash strike.

This backlash strike restraining means is used to cause the backlash strike restraint rotating torque Tcmg 1 to act on the first engaging member 51 directly or indirectly. Examples of the backlash strike restraining means are an electric actuator and a hydraulic actuator. Examples of the electric actuator are: a motor that is operated mainly as a motor but can also be operated as a generator if necessary; a generator that is operated mainly as a generator but can also be operated as a motor if necessary; and a motor/generator that is operated as either a motor or a generator according to the form of control. Examples of the hydraulic actuator include a hydraulic motor. Since the first embodiment includes the first motor/generator 20 as a component able to adjust rotating torque acting on the first engaging member 51, the first motor/generator 20 is utilized as a backlash strike restraining means. Therefore, the backlash strike restraining control means includes the HVECU 104 and the MGECU 102.

The HVECU 104 calculates the MG1 torque required for the first motor/generator 20 to generate backlash strike restraint rotating torque Tcmg 1 after detecting a change from a driving to a driven state while running in fixed transmission ratio mode. The required MG1 torque is used to cause rotating torque in the same direction as that of rotating torque Tceng resulting from engine torque to act on the first engaging member 51, and is motor torque generated when the first motor/generator 20 is operated as a motor. This HVECU 104 obtains required MG1 rotation number (rotation in the negative direction, in this case) for generating the required MG1 torque, and transmits information about them to the MGECU 102. After a change occurs from driving to driven state as a result of this, the MGECU 102 adjusts the MG1 rotation number of the first motor/generator 20 to the required MG1 rotation number (in other words, the MGECU 102 shifts MG1 phase), and generates backlash strike restraint rotating torque Tcmg 1 for the first engaging member 51 by means of MG1 torque (motor torque) shown in FIG. 9.

For example, when a change occurs from driving to driven state, a change to the negative state occurs after the engine torque once changes to zero. Therefore, the direction of rotating torque acting on the first engaging member 51 reverses, as shown in the second drawing from the top in FIG. 8. The first engaging member 51 at this time is subjected to: rotating torque Tceng resulting from negative engine torque; rotating torque Tcr resulting from resistant torque applied by a road surface; and backlash strike restraint rotating torque Tcmg 1, which is reverse in direction to and smaller in absolute value than rotating torque yielded by the combination of these two rotating torques Tceng and Tcr. For this reason, the final rotating torque acting on the first engaging member 51 (=rotating torque Tctgt) is less than the rotating torque yielded by the combination of the two rotating torques Tceng and Tcr even though it is identical in direction to this rotating torque. Accordingly, the first engaging member 51 starts to rotate gently relative to the second engaging member 52, so that the cam groove 54 separates from the cam 53.

Before long, in this first engaging member 51, the cam groove 54 contacts the cam 53 again but on the opposite side to that in the previous contact, (the third drawing from the top in FIG. 8). This first engaging member 51 contacts the cam 53 gently as rotating torque applied to itself is restrained to a low level by the action of the backlash strike restraint rotating torque Tcmg 1. By virtue of this, occurrences of shock and noise while the first engaging member 51 is in contact with the cam 53 are restrained or reduced. In the first embodiment, required MG1 rotation number is set so that MG1 torque (motor torque) is constant, as shown in FIG. 7, after this contact. The MG1 rotation number at this time approaches zero. During this time, the first engaging member 51 presses the cam 53 against the cam groove 54 while gently rotating relative to the second engaging member 52 by virtue of the backlash strike restraint rotating torque Tcmg 1.

Thereafter, the cam 53 contacts the cam groove 54 of the second engaging member 52. Since this cam 53 has been depressed by the rotating torque (=rotating torque Tctgt) of the first engaging member 51, which has been restrained by the action of the backlash strike restraint rotating torque Tcmg 1, the cam 53 contacts the cam groove 54 of the second engaging member 52 gently. Additionally, since the HVECU 104 sets the required MG1 rotation number to zero at the time of contact, the MGECU 102 makes MG1 torque equal to zero by exerting control such that the MG1 rotation number becomes zero, as shown in FIG. 7. Consequently, the backlash strike restraint rotating torque Tcmg 1 also becomes zero, with the result that the first engaging member 51 is subjected to rotating torque Tceng resulting from the negative engine torque, and rotating torque Tcr resulting from resistant torque applied by a road surface (the bottom drawing in FIG. 8). Since the transmission mode remains fixed transmission ratio mode at this time, the first engaging member 51 is locked to the second engaging member 52 via the cam 53 while retaining contact with this cam 53. Consequently, the first motor/generator 20 is stopped again and put into an MG1 lock state. As described above, this backlash strike restraining control brings the first engaging member 51, the cam 53, and the second engaging member 52 gently into contact with one another by virtue of the backlash strike restraint rotating torque Tcmg 1, and reduces the MG1 torque to zero almost simultaneously with this contact, thereby making the backlash strike restraint rotating torque Tcmg 1 zero. Thus, the backlash strike restraining control is able to restrain or reduce shock and noise that may occur between the first engaging member 51 and the cam 53 and between this cam 53 and the second engaging member 52.

Backlash Strike Restraining Control During Chip-In Operation

Next will be described a backlash strike restraining operation exerted when a driver coast running in fixed transmission ratio mode performs acceleration (chip-in operation).

Figure 10:
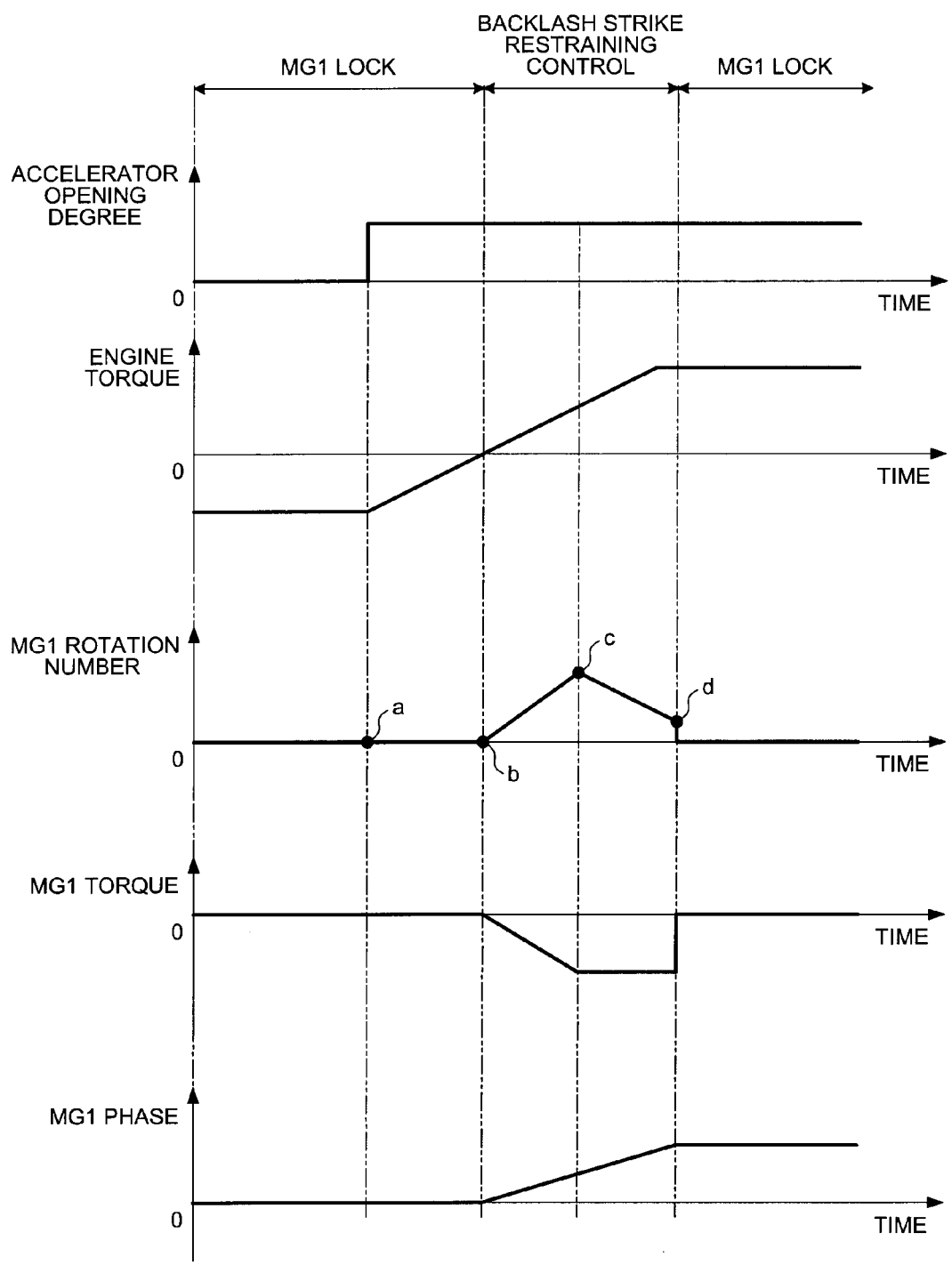
FIG. 10 is an example of a time chart for backlash strike restraining control during a chip-in operation, according to the first embodiment.

When a driver is not performing acceleration while running in the fixed transmission ratio mode, the engine torque remains in a negative state, as shown in the time chart in FIG. 10. On the other hand, the first motor/generator 20 in this case is in the same state as that while coast running described above, as the clutch 50 is in a clutch engaged state.

If the driver performs acceleration (the accelerator opening degree is greater than zero), the engine torque starts to increase, and the negative engine torque starts to approach zero. However, when acceleration begins, the engine torque is still in the negative state. Therefore, there is no change in the direction of rotating torque acting on the sun gear 45 and the first engaging member 51, and the state of the clutch 50 is barely different from that exhibited when acceleration is stopped (see the top drawing in FIG. 11). At this time also, the transmission mode is still in the fixed transmission ratio mode; therefore, in the first motor/generator 20, MG1 rotation number is zero, MG1 torque is zero, and MG1 phase is zero. The state shown in the top drawing in FIG. 11 continues until the engine torque becomes zero, that is, until immediately before a change occurs from a driven to a driving state. Strictly speaking, the rotating torque acing on the first engaging member 51 decreases in the same direction as the engine torque increases.

Figure 11:
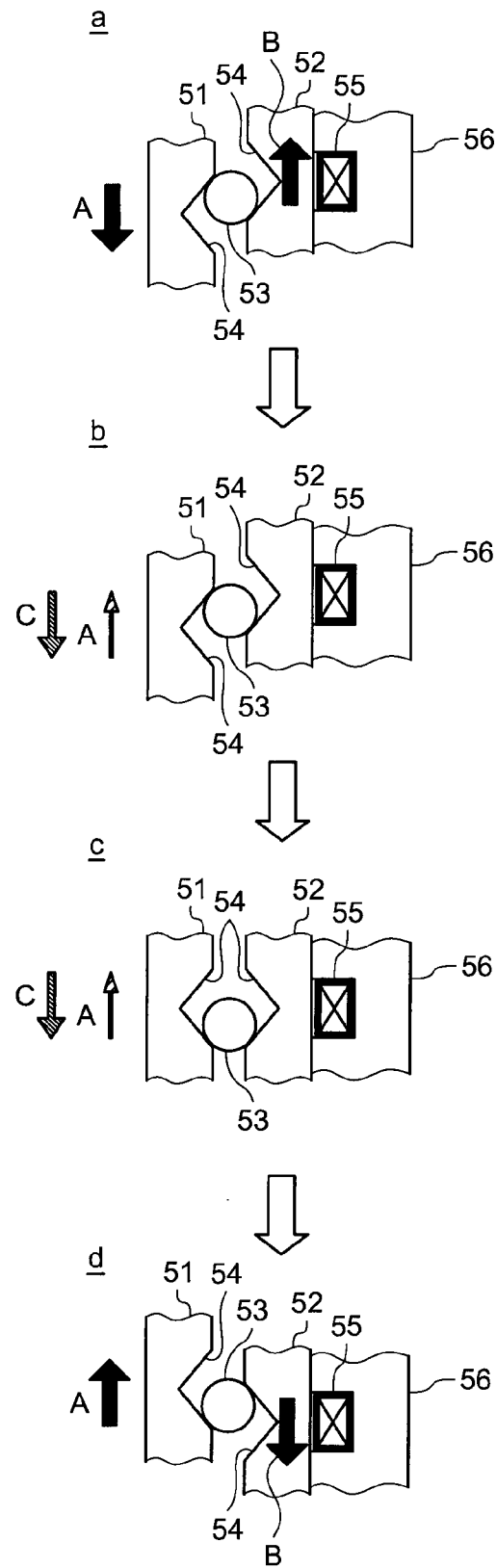
FIG. 11 is a diagram illustrating the states of the clutch in the backlash strike restraining control during the chip-in operation, according to the first embodiment.
Figure 12:
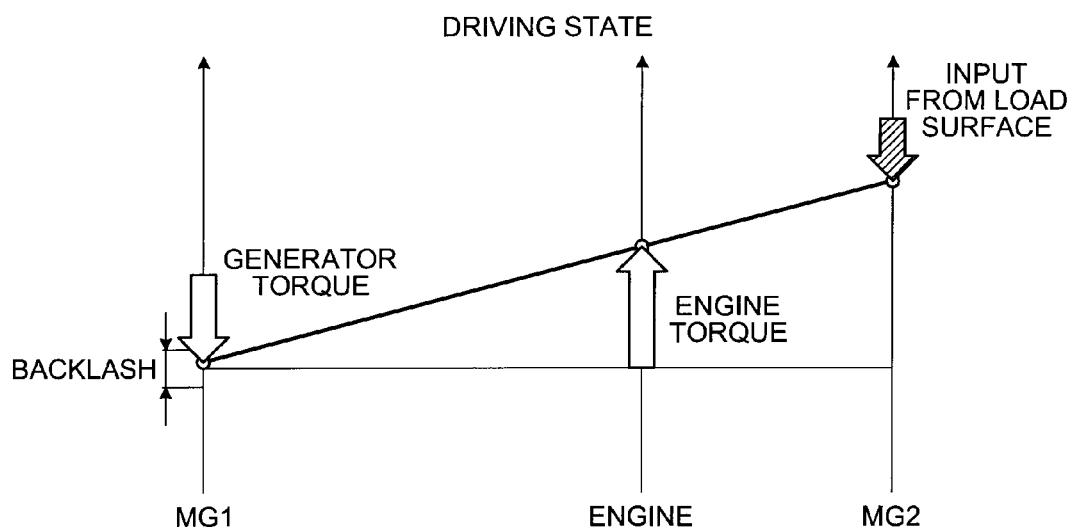
FIG. 12 is a collinear diagram representing a driving state in backlash strike restraining control during the chip-in operation, according to the first embodiment.

The arrows A, B, and C in FIG. 11 indicate the same as those in FIG. 8. In addition, the drawings a to d in FIG. 11 show the states of clutch 50 in time series, and correspond to drawings a to d in FIG. 10, respectively.

When the engine torque changes from a negative to a positive state (i.e., a change occurs from driven to driving state) due to the chip-in operation, the direction of the rotating torque acting on the sun gear 45 and first engaging member 51 reverses. If this state continues, the rotating torque acting on the first engaging member 51 increases according to the change in the positive engine torque, which may result in backlash strike. To overcome this drawback, a backlash strike restraining means is used to restrain occurrence of backlash strike by gradually taking up the backlash.

As in the exemplified case while coast running described above, the backlash strike restraining means is for applying backlash strike restraint rotating torque Tcmg 1 to the first engaging member 51 according to engine torque and resistant torque applied by a road surface, the backlash strike restraint rotating torque being against, in reverse direction to, and smaller in absolute value than the reversed rotating torque acting on the first engaging member 51. In this case also, the first motor/generator 20 is used as the backlash strike restraining means. The backlash strike restraint rotating torque Tcmg 1 used in this case is given by the equation 2 given below.

$$|Tcmg\ 1|=|Tceng|-|Tcr|-|Tctgt| \qquad (2)$$

The HVECU 104 calculates the MG1 torque required for the first motor/generator 20 to generate backlash strike restraint rotating torque Tcmg 1 after detecting a change from driven to driving state. The required MG1 torque is used to cause rotating torque in reverse direction to that of rotating torque Tceng resulting from engine torque to act on the first engaging member 51, and is generator torque generated when the first motor/generator 20 is operated as a generator. This HVECU 104 obtains the MG1 rotation number (rotation in a positive direction, in this case) required for generating the required MG1 torque, and transmits information about them to the MGECU 102. After a change occurs from the driven to the driving state as a result of this, the MGECU 102 adjusts the MG1 rotation number of the first motor/generator 20 to the required MG1 rotation number (in other words, the MGECU 102 shifts MG1 phase), and generates backlash strike restraint rotating torque Tcmg 1 for the first engaging member 51 by means of MG1 torque (generator torque) shown in FIG. 12.

For example, when a change occurs from a driven to a driving state, a change to a positive state occurs after the engine torque once changes to zero. Therefore, the direction of rotating torque acting on the first engaging member 51 reverses, as shown in the second drawing from the top in FIG. 11. The first engaging member 51 at this time is subjected to: rotating torque Tceng resulting from positive engine torque; rotating torque Tcr resulting from resistant torque applied by a road surface; and backlash strike restraint rotating torque Tcmg 1, which is reverse in direction to and smaller in absolute value than rotating torque yielded by the combination of these two rotating torques Tceng and Tcr. For this reason, the final rotating torque acting on the first engaging member 51 (=rotating torque Tctgt) is less than the rotating torque yielded by the combination of the two rotating torques Tceng and Tcr, even though it is identical in direction to the combination of the rotating torques. Accordingly, the first engaging member 51 starts to rotate gently relative to the second engaging member 52, such that the cam groove 54 separates from the cam 53.

Before long, in this first engaging member 51, the cam groove 54 contacts the cam 53 again but on the opposite side to that in the previous contact, (the third drawing from the top in FIG. 11). This first engaging member 51 gently contacts the cam 53 as rotating torque applied to itself is restrained to a low level by virtue of the backlash strike restraint rotating torque. As a result, occurrences of shock and noise when the first engaging member 51 is in contact with the cam 53 are restrained or reduced. In the first embodiment, required MG1 rotation number is set so that MG1 torque (generator torque) is constant, as shown in FIG. 10, after this contact. The MG1 rotation number at this time approaches zero. During this time, the first engaging member 51 presses the cam 53 against the cam groove 54 while gently rotating relative to the second engaging member 52 by virtue of the backlash strike restraint rotating torque Tcmg 1.

Thereafter, the cam 53 contacts the cam groove 54 of the second engaging member 52. Since this cam 53 has been depressed by the rotating torque (=rotating torque Tctgt) of the first engaging member 51, which has been restrained by the action of the backlash strike restraint rotating torque Tcmg 1, the cam 53 gently contacts the cam groove 54 of the second engaging member 52. Additionally, since the HVECU 104 sets the required MG1 rotation number to zero at the time of contact, the MGECU 102 makes MG1 torque zero by exerting control such that the MG1 rotation number becomes zero, as shown in FIG. 10. Consequently, the backlash strike restraint rotating torque Tcmg 1 also becomes zero, with the result that the first engaging member 51 is subjected to rotating torque Tceng resulting from positive engine torque, and rotating torque Tcr resulting from resistant torque applied by a road surface (the bottom drawing in FIG. 11). Since the transmission mode remains fixed transmission ratio mode at this time, the first engaging member 51 is locked to the second engaging member 52 via the cam 53 while retaining contact with the cam 53. Consequently, the first motor/generator 20 is stopped again and put into an MG1 lock state. As described above, the backlash strike restraining control brings the first engaging member 51, the cam 53, and the second engaging member 52 gently into contact with one another by virtue of the backlash strike restraint rotating torque Tcmg 1, and reduces the MG1 torque to zero almost simultaneously with this contact, thereby making the backlash strike restraint rotating torque Tcmg 1 zero. Thus, even during chip-in operation, the backlash strike restraining control is able to restrain or reduce shock and noise that may occur between the first engaging member 51 and the cam 53 and between the cam 53 and the second engaging member 52.

As described above, the control device of a vehicle according to the first embodiment exerts the backlash strike restraining control such that when switching occurs from a driving to a driven state or from a driven to driving state while running in the fixed transmission ratio mode, the rotation number of the first motor/generator 20 is adjusted (in other words, the rotation phase of the first motor/generator 20 is shifted), thereby generating backlash strike restraint rotating torque Tcmg 1 and taking up the backlash of the clutch 50 gradually. Thus, the control device is able to restrain occurrence of backlash of the clutch 50, and hence able to restrain or reduce shock and noise that may occur between the first engaging member 51 and the cam 53 and between this cam 53 and the second engaging member 52.

Second Embodiment

A control device of a vehicle according to the second embodiment of the present invention will now be described with reference to FIGS. 13 to 16.

The control device of a vehicle in the present second embodiment differs from the control device in the foregoing first embodiment in the form of the backlash strike restraining control.

Backlash strike restraining control according to the second embodiment is exerted such that when switching occurs from a driving to a driven state or from a driven to a driving state while running in the fixed transmission ratio mode, the clutch 50 is controlled so as to be kept in a half-engaged state until the backlash closes, thereby allowing the second engaging member 52 to rotate relative to the holding means 56 while sliding. In backlash strike control, the instant the backlash has closed when the first engaging member 51 presses the second engaging member 52 via the cam 53, and these are integrally rotated relative to the holding means 56. Accordingly, when the backlash has closed, force acting on the second engaging member 52 can be released from the first engaging member 51 and the cam 53. Thus, this backlash strike restraining control is able to restrain occurrence of backlash in the clutch 50, and hence able to restrain or reduce shock and noise that may occur between the first engaging member 51 and the cam 53 and between the cam 53 and the second engaging member 52. Therefore, in the second embodiment, the clutch 50 is used as a backlash strike restraining means, and the HVECU 104 and the MGECU 102 are used as backlash strike restraining control means.

Backlash Strike Restraining Control While Coast Running

First, a description is given of the backlash strike restraining control exerted while coast running in the fixed transmission ratio mode.

Figure 13:
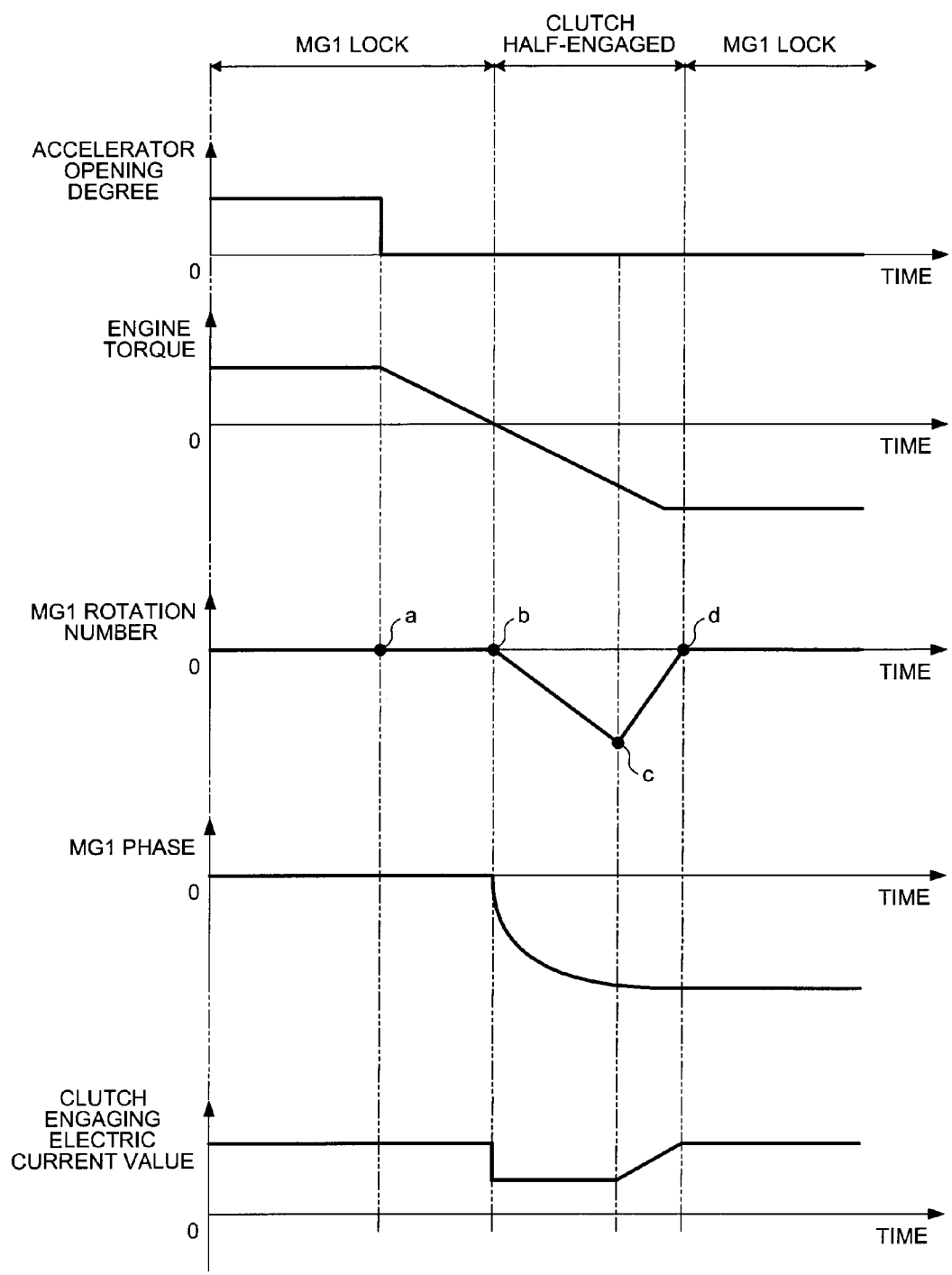
FIG. 13 is an example of a time chart for backlash strike restraining control while coast running, according to a second embodiment.

When a driver is accelerating in fixed transmission ratio mode, the engine 10 and the first motor/generator 20 are in the states as shown in the time chart in FIG. 13, which are the same as those in the first embodiment shown in FIG. 7. Since, in this case, the clutch 50 is in a clutch engaged state, a clutch engaging electric current with an electric current value (clutch engaging electric current value) enabling the clutch engaged state is applied to the electromagnetic coil 55, as shown in the time chart in FIG. 13.

Figure 14:
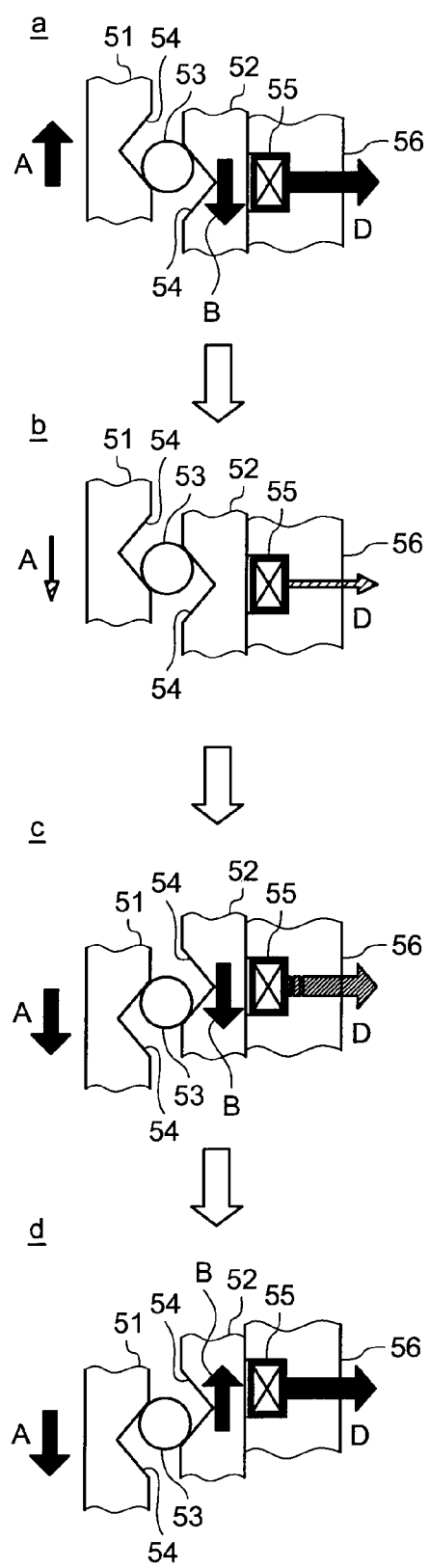
FIG. 14 is a diagram illustrating the states of the clutch in the backlash strike restraining control while coast running, according to the second embodiment.

Also when the driver stops accelerating (degree to which accelerator is open is zero) in such a state and as a result coasts, the engine 10 and the first motor/generator 20 are in the same states as those in the first embodiment, as shown in the time chart in FIG. 13, (see the top drawing in FIG. 14). The state shown in the top drawing in FIG. 14 continues until the engine torque becomes zero, that is, until immediately before a change occurs from a driving to a driven state. Strictly speaking, the rotating torque acing on the first engaging member 51 continues to decrease in the same direction as the engine torque decreases.

Until the engine torque becomes zero after the driver stops accelerating, a clutch engaging electric current with the same magnitude is continuously applied to the electromagnetic coil 55, thereby keeping the clutch 50 in the clutch engaged state, and hence the second engaging member 52 is not rotating. Therefore, the rotating torque acting on the second engaging member 52 during this time corresponds to the reaction force of rotating torque acting on the first engaging member 51, which equals that during acceleration.

The arrows A and B in FIG. 14 are identical to those in the first embodiment. Further, the arrow D in FIG. 14 represents electromagnetic attractive force relative to the second engaging member 52 of the electromagnetic coil 55, which corresponds to the magnitude of the clutch engaging electric current value. Since the clutch engaging electric current value is the greatest in the states shown in the top and bottom drawings in FIG. 14, the greatest electromagnetic attractive force is acting on the second engaging member 52. Compared to this, since the clutch engaging electric current value is smallest in the state shown in the second drawing from the top in FIG. 14, the smallest electromagnetic attractive force is acting on the second engaging member 52. The clutch engaging electric current value in the state shown in the second drawing is lower than the lowest electric current value at which the second engaging member 52 is attracted and fixed. In addition, the arrow D in the third drawing from the top represents electromagnetic attractive force when the clutch engaging electric current value is shifted from the above-mentioned lowest value to the highest value, that is, electromagnetic force is increasing gradually. The drawings a to d in FIG. 14 show the states of clutch 50 in time series, and correspond to the drawings a to d in FIG. 13, respectively.

When the engine torque changes from a positive to a negative state (that is, from a driving to a driven state) while coast running, the direction of rotating torque acting on the sun gear 45 and the first engaging member 51 reverses. At this time, in the second embodiment, the HVECU 104 commands the MGECU 102 to put the clutch 50 in a half-engaged state (the state in which the second engaging member 52 and the holding means 56 are able to rotate relative to each other while sliding over each other). The MGECU 102 that has received this direction exerts control so as to put the clutch 50 into the semi-engaged state, by decreasing the value of the clutch engaging electric current to be applied to the electromagnetic coil 55 serving as an electromagnetic attraction generating means. Thus, as shown in the second drawing from the top in FIG. 14, the electromagnetic attractive force relative to the second engaging member 52, the rotation of which has been stopped, decreases, allowing the second engaging member 52 to rotate relative to the holding means 56 while sliding over the holding means 56. This state is continued, until the cam groove 54 of the first engaging member 51 contacts the cam 53 again but on the opposite side to the previous contact and further the cam 53 contacts the cam groove 54 of the second engaging member 52. During this time, the first motor/generator 20 shifts the MG1 phase while increasing the MG1 rotation number in a negative rotating direction, as shown in FIG. 13.

When the cam 53 depressed by the first engaging member 51 contacts the cam groove 54 of the second engaging member 52, the second engaging member 52 is subjected to pressure from the first engaging member 51 via the cam 53. This pressure causes rotating torque in the same direction as the first engaging member 51 to act on the second engaging member 52 (see the third drawing from the top in FIG. 14). Thus, the second engaging member 52 enabled to rotate by virtue of the electromagnetic attractive force decrease starts to rotate together with the cam 53 relative to the holding means 56 while sliding.

Simultaneously with this contact, the HVECU 104 directs the MGECU 102 to increase the clutch engaging electric current value. The clutch engaging electric current is gradually increased to the original clutch engaging electric current value, as shown in FIG. 13. Accordingly, until the clutch engaging electric current value reaches the smallest electric current value at which the second engaging member 52 is attracted and fixed, the first engaging member 51, the cam 53, and the second engaging member 52 integrated together continue to rotate relative to the holding means 56. In this case, rotating torque acting on the first engaging member 51 itself decreases because the sliding motion between the second engaging member 52 and the holding means 56 according to increases in the mass of the second engaging member 52 and in the clutch engaging electric current value due to contact acts as resistance. Therefore, the speeds of the relative rotations decrease, and the MG1 rotation number gradually decreases, as shown in FIG. 13. In the end, when the clutch engaging electric current value reaches the lowest electric current value described above, the second engaging member 52 is fixed by the holding means 56, and the clutch 50 is put into the clutch engaged state again from the half-engaged state, so that the MG1 rotating speed reaches zero, the shifting of the MG1 phase finishes, and MG1 torque reaches zero. For example, if the clutch engaging electric current value has returned to its original magnitude, as shown in FIG. 13, in the case where the clutch engaging electric current value has been set to the lowest electric current value, the clutch 50 is put into the clutch engaged state (the bottom drawing in FIG. 14) from the semi-engaged state. In the state shown in the bottom drawing in FIG. 14, rotating torque corresponding to the reaction force of the rotating torque applied to the first engaging member 51 is acting on the second engaging member 52.

The backlash strike restraining control according to the second embodiment generates such relative rotation, thereby receiving and absorbing pressure applied to the second engaging member 52. Accordingly, backlash strike is restrained, thus making it possible to restrain or reduce shock and noise that may occur between the first engaging member 51 and the cam 53 and between the cam 53 and the second engaging member 52.

Backlash Strike Restraining Control During Chip-In Operation

Next will be described a backlash strike restraining operation exerted when a driver coast running in fixed transmission ratio mode performs acceleration (chip-in operation).

Figure 15:
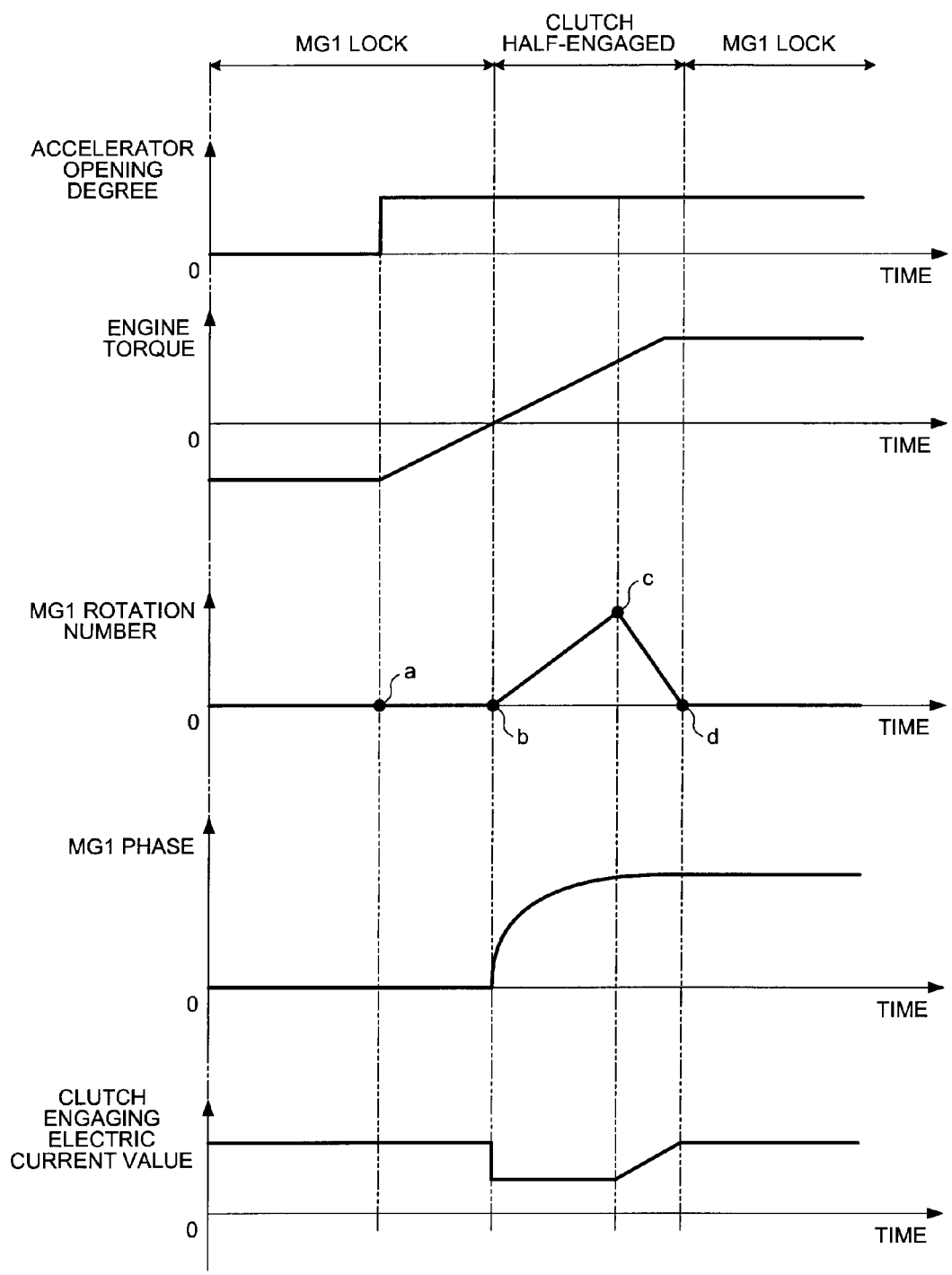
FIG. 15 is an example of a time charge in backlash strike restraining control during a chip-in operation, according to the second embodiment.

When a driver is not performing acceleration while running in fixed transmission ratio mode, the engine 10 and the first motor/generator 20 are in the same states as those in the first embodiment, as shown in the time chart in FIG. 15. In addition, a clutch engaging electric current of sufficient magnitude as to put the clutch 50 into a clutch engaged state is applied to the electromagnetic coil 55 at this time.

Figure 16:
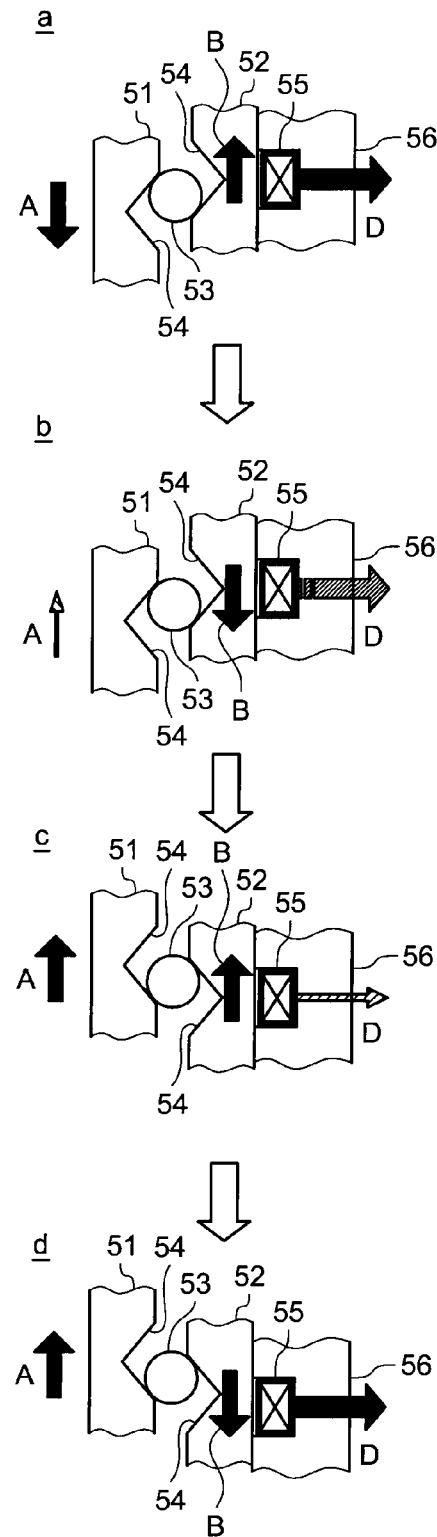
FIG. 16 is a diagram illustrating the states of the clutch in the backlash strike restraining control during chip-in operation, according to the second embodiment.

When the driver accelerates (the accelerator opening degree is greater than zero) in such a state also, the engine 10 and the first motor/generator 20 are in the same states as those in the first embodiment, as shown in the time chart in FIG. 15 (see the top drawing in FIG. 16). The state shown in the top drawing in FIG. 16 continues until engine torque becomes zero, that is, until immediately before change occurs from a driven to a driving state. Strictly speaking, the rotating torque acting on the first engaging member 51 decreases in the same direction that engine torque increases.

Until engine torque becomes zero after the driver has started accelerating, a clutch engaging electric current with the same magnitude is continuously applied to the electromagnetic coil 55, thereby keeping the clutch 50 in the clutch engaged state, and hence the second engaging member 52 does not rotate. Therefore, the rotating torque acting on the second engaging member 52 during this time corresponds to the reaction force of rotating toque acting on the first engaging member 51, which is the same as that generated when not accelerating.

The arrows A, B, and C in FIG. 16 are identical to those in FIG. 14. The drawings a to d in FIG. 16 show the states of clutch 50 in time series, and correspond to drawings a to d in FIG. 15, respectively.

When the engine torque changes from a negative to a positive state (i.e., change occurs from a driven to a driving state) due to the chip-in operation, the direction of rotating torque acting on the sun gear 45 and the first engaging member 51 is reversed. At this time, as in coast running described above, control is exerted such that the clutch 50 is put into a half-engaged state by decreasing a clutch engaging current value as in FIG. 15. Thus, as shown in the second drawing from the top in FIG. 16, the electromagnetic attractive force relative to the second engaging member 52 decreases, enabling the second engaging member 52 to rotate relative to the holding means 56 while sliding over the holding means 56. This state is continued until the cam groove 54 of the first engaging member 51 contacts the cam 53 again but on the opposite side to the previous contact and further the cam 53 contacts the cam groove 54 of the second engaging member 52. During this time, the first motor/generator 20 shifts the MG1 phase while increasing the MG1 rotation number in the direction of positive rotation, as shown in FIG. 15.

When the cam 53 depressed by the first engaging member 51 contacts the cam groove 54 of the second engaging member 52, the second engaging member 52 is subjected to pressure from the first engaging member 51 via the cam 53, as in coast running described above. This pressure causes rotating torque in the same direction as the first engaging member 51 to act on the second engaging member 52 (see the third drawing from the top in FIG. 16). Thus, the second engaging member 52, together with the first engaging member 51 and the cam 53, starts to rotate relative to the holding means 56 while sliding.

Simultaneously with this contact, the HVECU 104 commands the MGECU 102 to increase the clutch engaging current value as in that performed while coast running. As a result, when the clutch engaging electric current value reaches the lowest electric current value at which the second engaging member 52 is attracted and fixed, the second engaging member 52 is fixed by the holding means 56 and put into the clutch engaged state again (the bottom drawing in FIG. 16), and the MG1 rotation number gradually decreases to zero, as shown in FIG. 15. Thus, in the first motor/generator 20, the shifting of the MG1 phase finishes and the MG1 torque becomes zero. Thus, even in the chip-in operation, pressure applied to the second engaging member 52 is received and absorbed by causing such relative rotation. Thus, the backlash strike restraining control device according to the second embodiment is able to restrain backlash, and hence able to restrain or reduce shock and noise that may occur between the first engaging member 51 and the cam 53 and between this cam 53 and the second engaging member 52.

As described above, the vehicle apparatus in the second embodiment exerts control such that, when switching from a driving to a driven or from a driven to a driving state occurs in fixed transmission ratio mode, the clutch 50 is put into the semi-engaged state from the clutch engaged state, thereby bringing about a state in which the second engaging member 52 is able to rotate relative to the holding means 56 while sliding. For this reason, this control device relieves pressure exerted when the cam 53 depressed by the first engaging member 51 contacts the second engaging member 52; thus, the apparatus is able to restrain backlash strike in the clutch 50, and hence able to restrain or reduce shock and noise that may occur between the first engaging member 51 and the cam 53 and between this cam 53 and the second engaging member 52. Additionally, since this control device does not adjust the rotation number of the first motor/generator 20 as actively as in the first embodiment, no consumption of secondary battery power is necessary, especially when motor torque is generated. Further, this control device decreases the clutch engaging current value. Therefore, this control device surpasses that in the first embodiment in fuel consumption performance.

Backlash strike restraining control according to the second embodiment may be configured as exemplified above. However, this control may be used in combination with any content of the backlash strike restraining control according to the first embodiment described above.

Third Embodiment

A control device of a vehicle according to the third embodiment of the present invention will now be described with reference to FIGS. 17 to 21.

As one control form for an automatic transmission, a so-called coast downshift control has been known, in which when a driver stops acceleration and coasts the vehicle, a gear speed or a transmission ratio is down shifted to a low gear speed or high transmission ratio, respectively. In the third embodiment, the transmission ECU 103 is configured so that coast downshift control is exerted for the transmission mechanism of a hybrid vehicle. For example, when a coast downshift control request is detected, the transmission mode is set to a continuously variable transmission mode, thereby increasing the transmission ratio.

In this case, a driver may perform an accelerator quick close operation for quickly releasing the accelerator pedal when stopping acceleration. Subsequently, the driver may press the accelerator pedal immediately after this accelerator quick close operation. When releasing/depressing of the accelerator pedal of this type is repeated, the automatic transmission must be properly controlled. Otherwise, a so-called busy shift state may occur, in which the automatic transmission repeats up-shift and down-shift, resulting in degraded drivability. For example, there may be a situation in which, although it depends upon turning radius, a corner may be raised by performing an accelerator quick close operation before entering the corner, and then performing acceleration at the rising start point the vehicle reached immediately after the accelerator quick close operation. At this time, if the automatic transmission is up-shifted as a result of the accelerator quick close operation, and downshift is performed by the subsequent acceleration, one may not obtain a stable sensation of turning. To overcome this, as another control form for the automatic transmission, busy shift restraining control is conventionally known, in which, when an acceleration quick close operation is detected, a determination is made that busy shift may occur, and busy shift is prevented. This busy shift restraining control prevents busy shift by inhibiting up-shift, for example, when an acceleration quick close operation is performed, and by maintaining the current transmission ratio. In the third embodiment, the HVECU 104, the transmission ECU 103, etc., are configured so as to carry out at least the former determination of the possibility/impossibility of busy shift and busy shift restraining control. For example, if busy shift restraining control is requested, the transmission mode is set to the fixed transmission ratio mode, thereby maintaining the transmission ratio.

However, in the hybrid vehicle in the third embodiment, the clutch 50 is provided with backlash. Therefore, even when busy shift restraining control is exerted, shock or noise may occur as a result of taking up the backlash when an accelerator quick close operation is performed followed by acceleration.

Therefore, the third embodiment is configured such that if a determination is made that busy shift may be performed (hereinafter referred to as "busy shift determination"), the rotation of the first engaging member 51 relative to the second engaging member 52 is inhibited, such that taking up of the backlash of the clutch 50 is prevented to restrain backlash strike. Conversely, if coast downshift control is required (hereinafter referred to as "coast downshift determination"), backlash strike restraining control as in the first or second embodiment described above is performed.

Whether busy shift determination or coast downshift determination is required is determined based on the returning speed of the accelerator pedal or the deceleration of the accelerator opening degree. For example, as a reference threshold value for the determination, the same value may be set as that used for conventional busy shift determination. Therefore, when the returning speed of the accelerator pedal or the deceleration of the accelerator opening degree exceeds the threshold value, the HVECU 104 is caused to perform busy shift determination; when the returning speed of the accelerator pedal and the deceleration of the accelerator opening degree is equal to or less than the threshold value, the HVECU 104 is caused to perform coast downshift determination. The returning speed of the accelerator pedal and the deceleration of the accelerator opening degree are found using, for example, an accelerator displacement amount detecting means 95, shown in FIG. 1, such as a pedal position sensor, which detects the amount by which an accelerator has moved.

Figure 17:
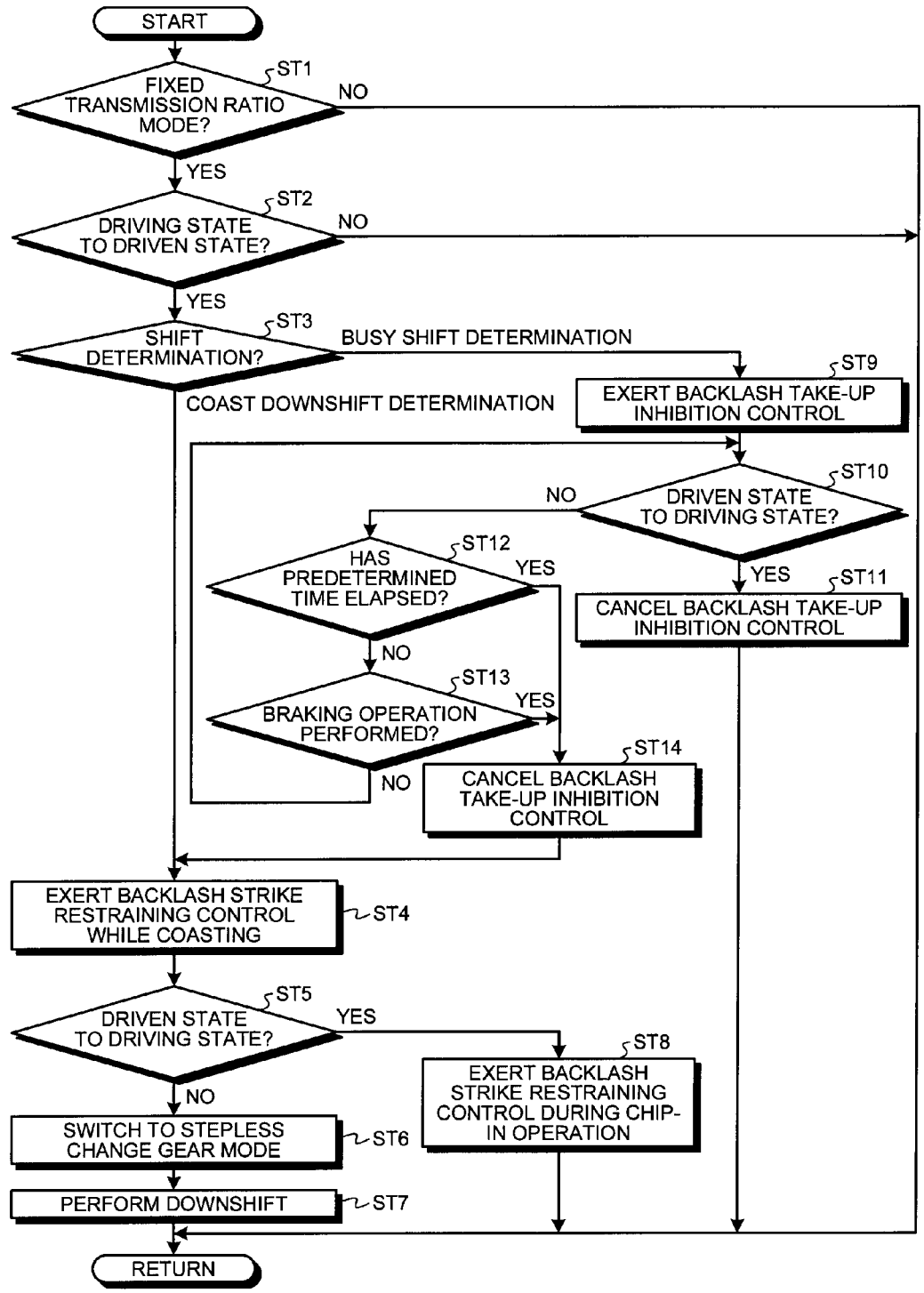
FIG. 17 is a flowchart explaining a control operation of the control device of a vehicle according to the present invention.

Control for each determination result will now be described with reference to the flowchart in FIG. 17.

First, the EVECU 104 determines whether the clutch 50 is in a clutch engaged state and the first motor/generator 20 is in an MG1 lock state, that is, whether the transmission mode for the transmission mechanism has been in fixed transmission ratio mode or not (step ST1).

Here, if a determination is made that a fixed transmission ratio mode has not been set, control operation is temporarily stopped and the control returns to step ST1.

If a determination is made that a fixed transmission ratio mode has been set, the HVECU 104 next determines whether switching from a driving to a driven state has occurred or not (step ST2). For example, this determination is made using the absolute value of rotating torque Tceng resulting from the engine torque described in the first embodiment, and the absolute value of the rotating torque Tcr resulting from resistant torque applied by a road surface. That is, if the absolute value of the rotating torque Tceng resulting from the engine torque is greater than the absolute value of the rotating torque Tcr resulting from the resistant torque applied by the road surface, a determination is made that a driving state has been set. Compared to this, if this magnitude relation is reversed, a determination is made that a driven state has been set. Therefore, depending whether the magnitude is reversed, the HVECU 104 is caused to determine that switching from a driven to a driving state or from a driven to a driving state has occurred.

If the HVECU 104 determines that switching from a driving to a driven state has not occurred in step ST2, the HVECU 104 temporarily suspends the control operation and returns to step ST1.

Conversely when the HVECU 104 determines that switching from a driving to a driven state has occurred, the HVECU 104 determines whether busy shift or coast downshift determination is required based on the returning speed of the accelerator pedal released by a driver, the deceleration of the accelerator opening degree, and threshold values (step ST3).

If it determines that the coast downshift has been required, the EVECU 104 exerts backlash strike restraining control while coast running as described in the first or second embodiment (step ST4).

After restraining or reducing shock and noise in the clutch 50 while coast running by exerting this backlash strike restraining control, the HVECU 104 determines whether switching from a driven to a driving state has occurred as a result of acceleration performed by a driver (a chip-in operation)(step ST5).

If it determines that switching from a driven to a driving state has not occurred in step ST5, that is, if it determines that a driven state is continuing while the driver is not performing acceleration, the HVECU 104 commands the MGECU 102 to switch the transmission mode of the transmission mechanism to continuously variable transmission mode from fixed transmission mode (step ST6). At this time, the MGECU 102 exerts control such that the clutch 50 is put into a clutch released state, thereby changing transmission mode to continuously variable transmission ratio mode. Subsequently, the HVECU 104 commands the transmission ECU 103 to downshift the transmission mechanism to a transmission ratio higher than the current one (step ST7). Thereby, coast downshift is exerted while coast running. Thus, the control device of a vehicle according to the third embodiment is capable of coast downshift while restraining or reducing shock and noise in the clutch 50.

Conversely, if it determines in step ST5 that switching from a driven to a driving state has occurred, that is, if it determines that a chip-in operation is being performed by the driver, the HVECU 104 performs backlash strike restraining control during the chip-in operation as described in the first or second embodiment (step ST8). Thus, if a chip-in operation is performed while coast running, the control device of a vehicle in the third embodiment is able to restrain or reduce shock and noise in the clutch 50 by exerting backlash strike restraining control.

If it determines in step ST3 that busy shift determination is required, the HVECU 104 exerts backlash take-up inhibition control (Step ST9).

Backlash take-up inhibition control will now be described. As shown in the time chart in FIG. 18 and drawings in FIG. 19, the first motor/generator 20 in a driving state (engine torque is positive) is in the same state as that in the backlash strike restraining control while coast running (see FIGS. 7 and 8). The arrows A and B in FIG. 19 represent the same as those in FIG. 8. On the other hand, the arrow E in FIG. 19 represents backlash take-up inhibition rotating torque Tcmg 2, which is described below. The drawings a to d in FIG. 19 show the states of the clutch 50 in time series, and correspond to the points a to d in FIG. 18, respectively.

If it is determined that busy shift determination is required and that switching from a driving to a driven state has occurred, the rotating torque Tcr resulting from resistant torque applied by a road surface exceeds the rotating torque Tceng resulting from the engine torque, so that the direction of the rotating torque acting on the sun gear 45 and the first engaging member 51 is reversed. Therefore, in order to restrain backlash strike of the clutch 50 at this time, backlash taking up of the clutch 50 is inhibited by preventing the first engaging member 51 from rotating relative to the second engaging member 52.

In this backlash take-up inhibition control, rotation inhibition torque (hereinafter referred to as "backlash take-up inhibition rotating torque") Tcmg 2 is applied to the first engaging member 51 according to the engine torque and resistant torque applied by a road surface, the backlash take-up inhibition rotating torque being against, in reverse direction to, and smaller in absolute value than the reversed rotating torque acting on the first engaging member 51, (|Tcmg 2|>|Tcr|− Tceng|). The backlash take-up inhibition rotating torque Tcmg 2 is pressing torque applied to the cam 53 and the second engaging member 52 caused to act on the first engaging member 51 so that the cam mechanism is stationary while maintaining a locked state. The hybrid vehicle 1 in the third embodiment includes a backlash take-up inhibiting means for generating the backlash take-up inhibition rotating torque Tcmg 2 and a backlash take-up inhibition control means for, for example, calculating, the backlash take-up inhibition rotating torque Tcmg 2.

The backlash take-up inhibiting means is used to cause the backlash take-up inhibition rotating torque Tcmg 2 to act on the first engaging member 51 directly or indirectly. Examples of the backlash take-up inhibiting means include an electric actuator, such as a motor, and a hydraulic actuator. Since the first embodiment includes the first motor/generator 20 as a component able to adjust rotating torque acting on the first engaging member 51, this first motor/generator 20 is utilized as a backlash take-up inhibiting means. Therefore, backlash take-up inhibiting control means include the HVECU 104 and the MGECU 102.

The HVECU 104 obtains the backlash take-up inhibition rotating torque Tcmg 2 when a determination is made that busy shift is required and that switching from a driving to a driven state has occurred. The HVECU 104 then calculates MG1 torque required for the first motor/generator 20 to generate the backlash take-up inhibition rotating torque Tcmg 2. The required MG1 torque is used to cause rotating torque in the same direction as the rotating torque Tceng resulting from engine torque to act on the first engaging member 51, and is motor torque generated when the first motor/generator 20 is operated as a motor. The HVECU 104 transmits information about the required MG1 torque to the MGECU 102. Thus, after a change occurs from a driving to a driven state, the MGECU 102 adjusts the MG1 rotation number of the first motor/generator 20 to the required MG1 rotation number, prevents rotation of the first engaging member 51 relative to the second engaging member 52 by using the MG1 torque (motor torque), and thus inhibits backlash take-up of the clutch 50.

Figure 18:
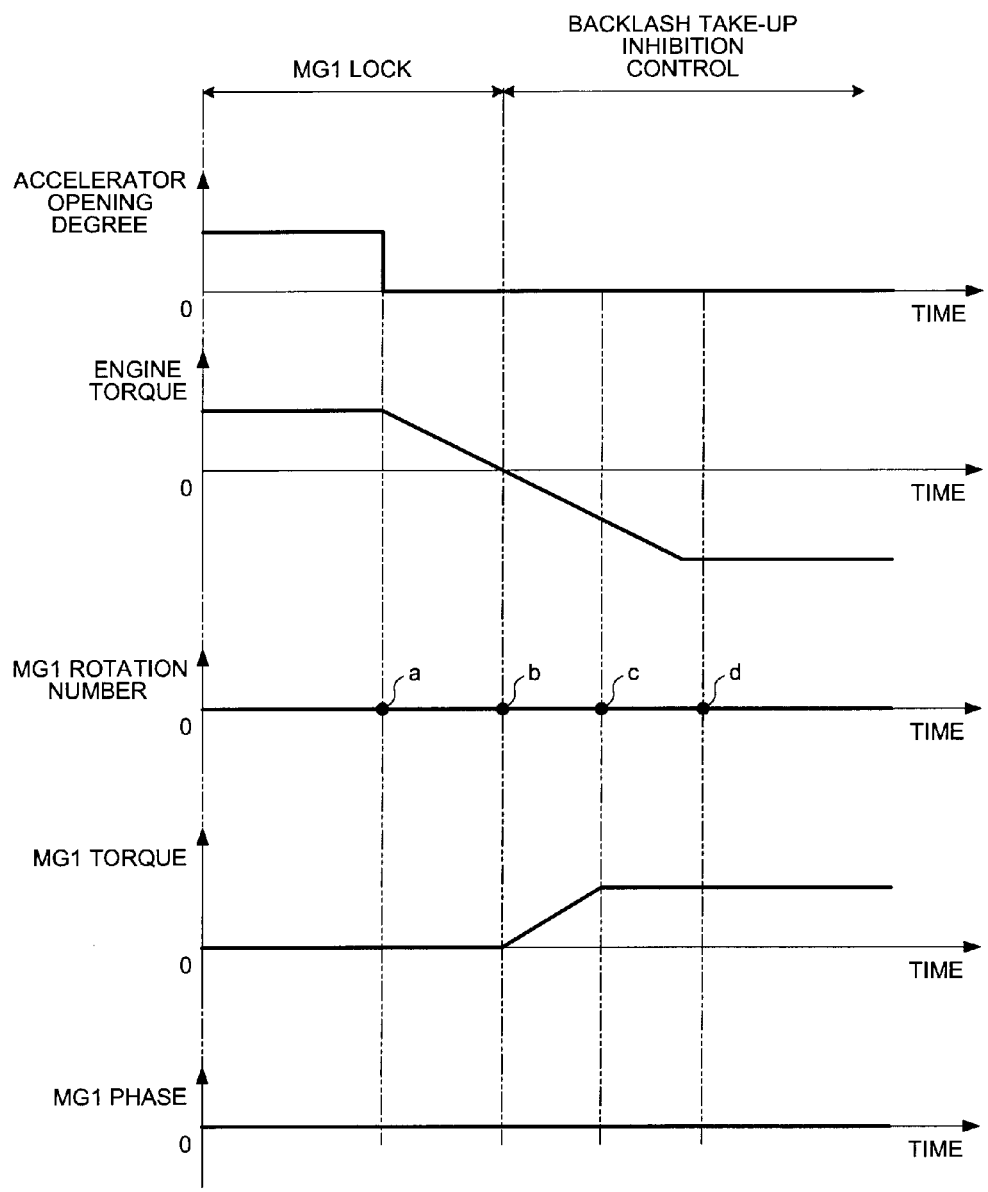
FIG. 18 is an example of a time chart for backlash take-up inhibition control according to a third embodiment.
Figure 19:
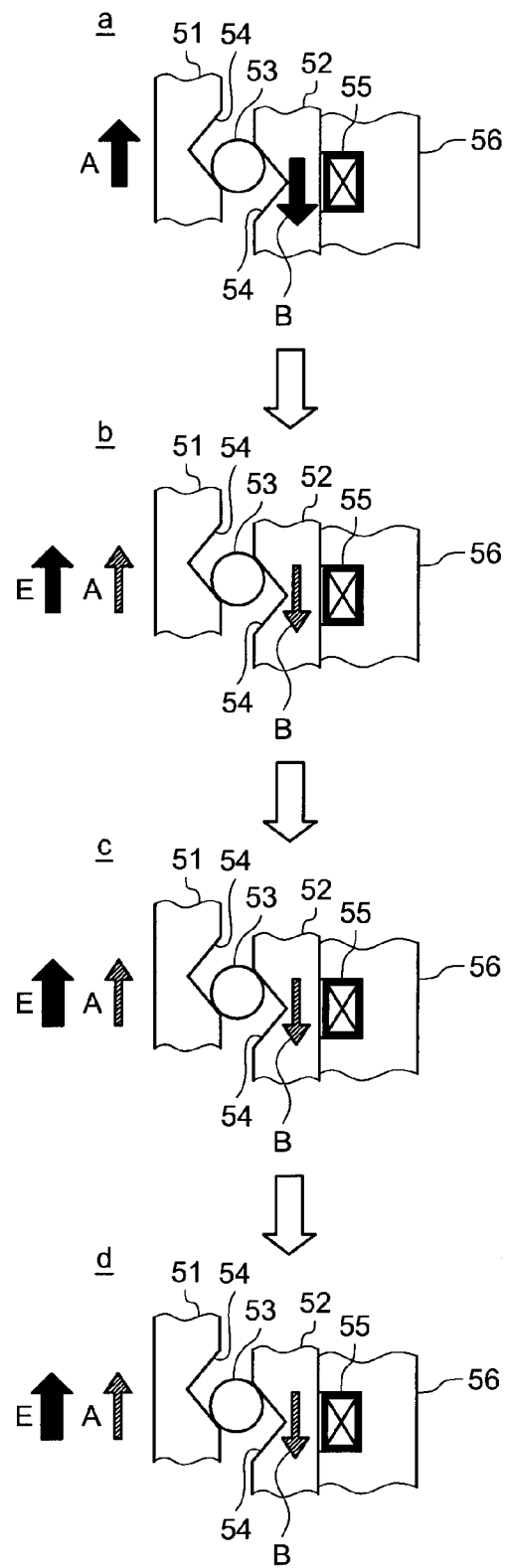
FIG. 19 is a diagram illustrating the states of the clutch in the backlash take-up inhibition control, according to the third embodiment.
Figure 20:
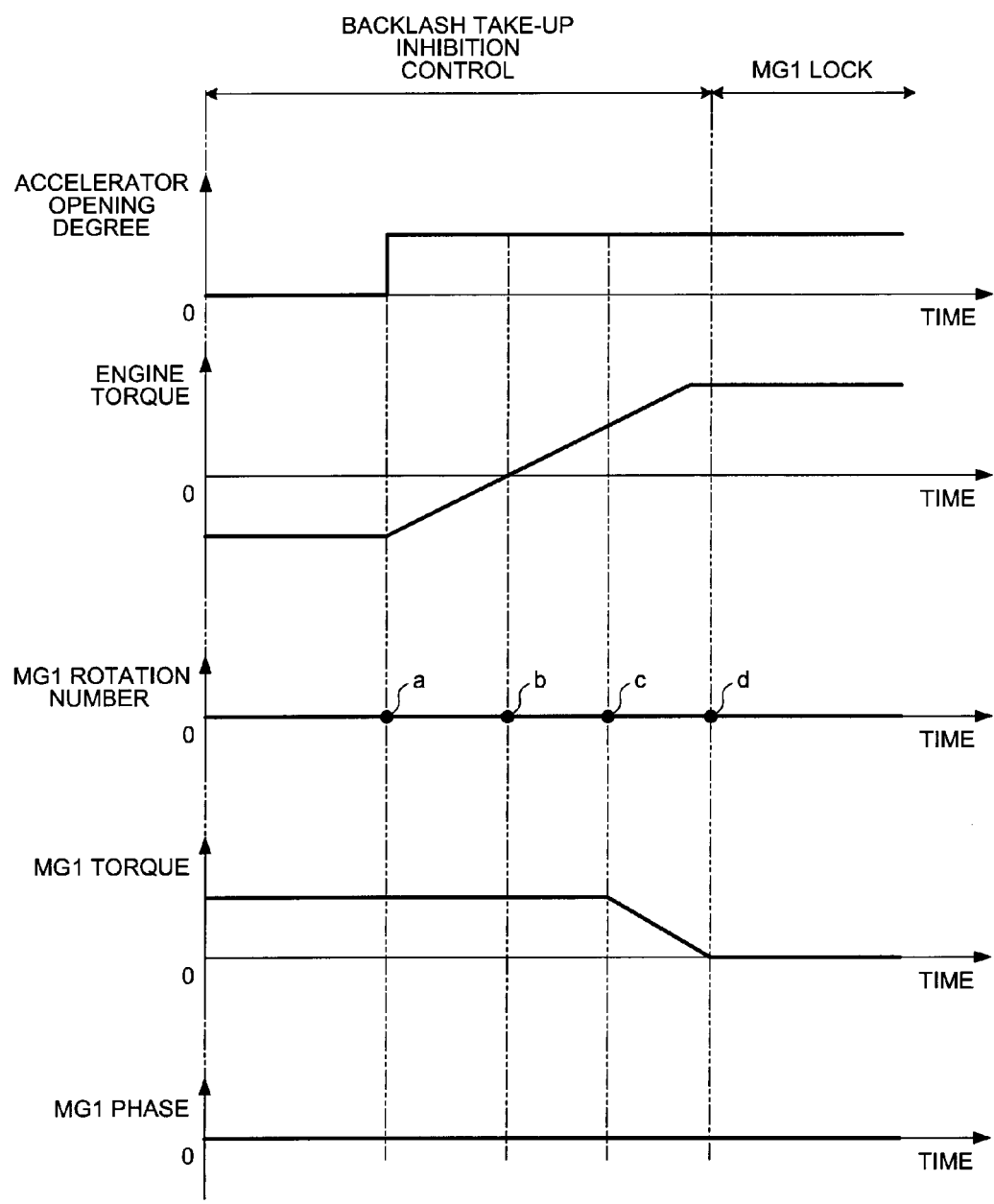
FIG. 20 is an example of a time chart when the backlash take-up inhibition control according to the third embodiment is cancelled.

In this case, the HVECU 104 gradually increases the MG1 torque (required MG1 torque) as shown in the time chart in FIG. 18, and then holds this torque at a fixed value (See b to c to d in FIGS. 18 and 19). It is preferable that a fixed value for the required MG1 torque be determined in advance by experiment or the like so as to be sufficient to maintain a backlash take-up inhibition state even if, for example, the resistant torque applied by a road surface changes. Since transmission mode at this time is fixed transmission ratio mode, the MT rotation number is zero, and there is no change in the MG1 phase.

This backlash take-up inhibition control continues until a cancellation condition for backlash take-up inhibition control has been satisfied.

After exerting backlash take-up inhibition control, the HVECU 104 determines whether switching from a driven to a driving state has occurred as a result of acceleration (chip-in operation), that is, whether the cancellation condition for the backlash take-up inhibition control has been satisfied or not (step ST10). If it is determined that switching from the driven to the driving state has occurred, the HVECU 104 cancels backlash take-up inhibition control (step ST11).

Figure 21:
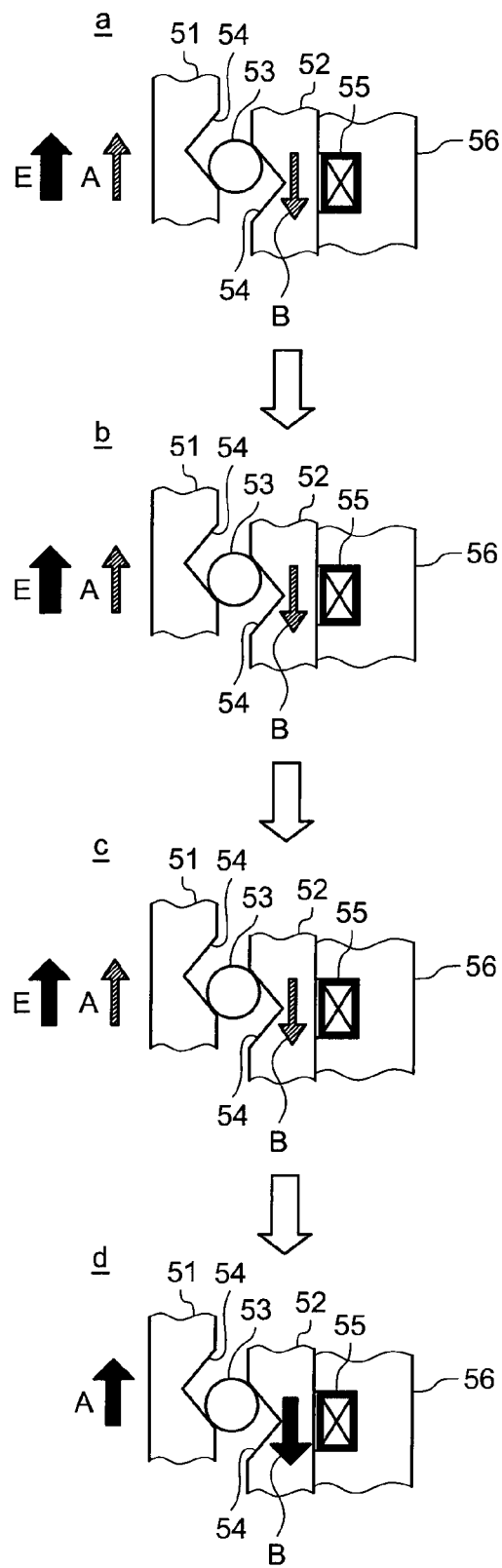
FIG. 21 is a diagram illustrating the states of the clutch when the backlash take-up inhibition control according to the third embodiment is cancelled.

Backlash take-up inhibition control will now be described. As shown in the time chart in FIG. 20 and drawings in FIG. 21, the engine 10 and the first motor/generator 20 maintain the same state as that in backlash take-up inhibition control. The arrows A, B, and E in FIG. 21 represent the same as those in FIG. 21. The drawings a to d in FIG. 21 show the states of the clutch 50 in time series, and correspond to the points a to d in FIG. 20, respectively.

If a determination is made that switching from a driven to a driving state has occurred during backlash take-up inhibition control, the rotating torque Tceng resulting from the engine torque exceeds the rotating torque Tcr resulting from resistant torque applied by a road surface, with the result that the direction of rotating torque acting on the sun gear 45 and the first engaging member 51 is reversed. Therefore, even if the backlash take-up inhibition rotating torque Tcmg 2 ceases to act on the first engaging member 51 as a result of backlash inhibition control's stopping, rotation of the first engaging member relative to the second engaging member 52 is prevented, thus restraining shock and noise in the clutch 50.

However, if a change occurs in the resistant torque applied by a road surface, the magnitude relation between the rotating torque Tceng resulting from engine torque and the rotating torque Tcr resulting from resistant torque applied by the road surface may reverse. Therefore, it is preferable to stop backlash inhibition control once the difference between these rotating torques increases, that is, after positive engine torque increases to a certain degree. For example, as shown in the time chart in FIG. 20, the required MG1 torque (motor torque) is decreased (c to d in FIGS. 20 and 21) after, for example, a predetermined time of several milliseconds has passed after the determination was made that switching from a driven to a driving state has occurred as shown in the time chart in FIG. 20. Thereby, the backlash take-up inhibition rotating torque Tcmg 2 decreases, and cancellation of backlash take-up inhibition control is initiated. Consequently, the required MG1 torque (motor torque) becomes zero, and the cancellation operation for the backlash take-up inhibition control finishes at this time. Also at this time, the required MG1 torque is decreased gradually because if the required MG1 torque (motor torque) is decreased to zero precipitately, the backlash take-up inhibition rotating torque Tcmg 2 may be removed suddenly, possibly resulting in shock or the like.

At the time that the cancellation operation for the backlash take-up inhibition control has finished, the rotating torque Tceng resulting from engine torque will have become greater than the rotating torque Tcr resulting from the resistant torque applied by a road surface. For this reason, in the hybrid vehicle 1, the cam mechanism of the clutch 50 maintains a locking state as in backlash take-up inhibition control. Accordingly, running in fixed transmission ratio corresponding to engine torque begins simultaneously with the end of the cancellation operation for backlash take-up inhibition control.

As described above, when it is determined that busy shift is required and that switching from a driven to a driving state has occurred, the HVECU 104 exerts backlash take-up inhibition control, thereby rendering the cam mechanism stationary while maintaining it in a locked state. Therefore, even when switching occurs from a driven to a driving state, the control device of a vehicle in the third embodiment prevents backlash strike and hence shock and noise in the clutch 50. Further, even if the accelerator pedal is pressed immediately after acceleration is stopped, this control device is able to resume running in fixed transmission ratio mode after cancellation of backlash take-up inhibition control, without causing shock and noise. Furthermore, this control device is able to avoid busy shift because it does not alter the transmission ratio while maintaining a fixed range gear ratio after busy shift determination.

As described above, cancellation of the backlash take-up inhibition control is led by acceleration (chip-in operation) performed by a driver. However, a driver may not perform acceleration even after a busy shift determination is made. For example, there may be a situation such that, although an acceleration quick close operation was performed in order to accelerate the vehicle by immediately acceleration, deceleration resulting from coast running or braking may have been required depending on the situation regarding the road in use, the vehicles running near the vehicle, or the like. In this case, in step ST10, a determination is made that switching from a driven to a driving state has not occurred.

In this case, after a certain period of time has elapsed after initiation of backlash take-up inhibition control, the previous returning operation for the accelerator pedal performed by the driver is prevented from inducing busy shift. In addition, if a braking operation is carried out after the returning operation of the accelerator pedal, busy shift does not occur.

For this reason, if it determines that switching from a driven to a driving state has not occurred, the HVECU 104 then determines whether the predetermined time has elapsed since initiation of backlash take-up inhibition control (step ST12). The predetermined time be may any time slightly longer than the time interval between the opening and closing operations for the accelerator pedal that induces the busy shift.

If it determines in step ST12 that the predetermined time has not elapsed, the HVECU 104 next determines whether the driver has performed a braking operation or not (step ST13). If it determines in the step ST13 that braking has not been performed, the HVECU 104 returns to the step ST10 and repeats the same determination.

Conversely, if it determines in the step ST12 that a predetermined time has elapsed or if it determines in the step ST13 that braking has been performed, the HVECU 104 adjusts the result of the shift determination to coast downshift determination, thereby canceling backlash take-up inhibition control (step ST14), and then proceeds to step ST4 as described above. Backlash take-up inhibition control is performed in the same manner as described above. Thus, since the control device of a vehicle in the third embodiment corrects the result of the shift determination, thereby canceling backlash take-up inhibition control, supply of power to the first motor/generator 20 in order to exert backlash take-up inhibition control can be stopped and wasteful consumption of second battery power can be reduced.

The third embodiment described above uses a preset threshold value value when making the shift determination in step ST3. However, returning speed of the accelerator pedal (or deceleration of the accelerator opening degree) differs according to driver. Therefore, there may be the possibility that even though a driver requested coast downshift and fully depressed the accelerator pedal, busy shift determination may be made. To counteract this, where busy shift determination is made, the HVECU 104 measures the returning speed of the accelerator pedal (or deceleration of the accelerator opening degree) and also measures the time taken for the accelerator pedal to be opened again after closing. It is preferable for the HVECU 104 to update the threshold value to an appropriate value based on statistics derived from these items of information. Alternatively, each item of information may be incorporated into map data, and this map data may be updated every time new information is obtained. This improves accuracy in shift determination. As a result, cancellation operations for the backlash take-up inhibition control, resulting from such erroneous determination as coast downshift's having not been determined. Hence, it is possible to restrain wasteful consumption of secondary battery power resulting from superfluous backlash take-up inhibition control.

In each of the first to third embodiments, the clutch 50 with a cam mechanism is used as an example. However, a clutch of any form may be used as long as it has a structure that has backlash and allows for allowance during operation to a degree corresponding to backlash.

Figure 22:
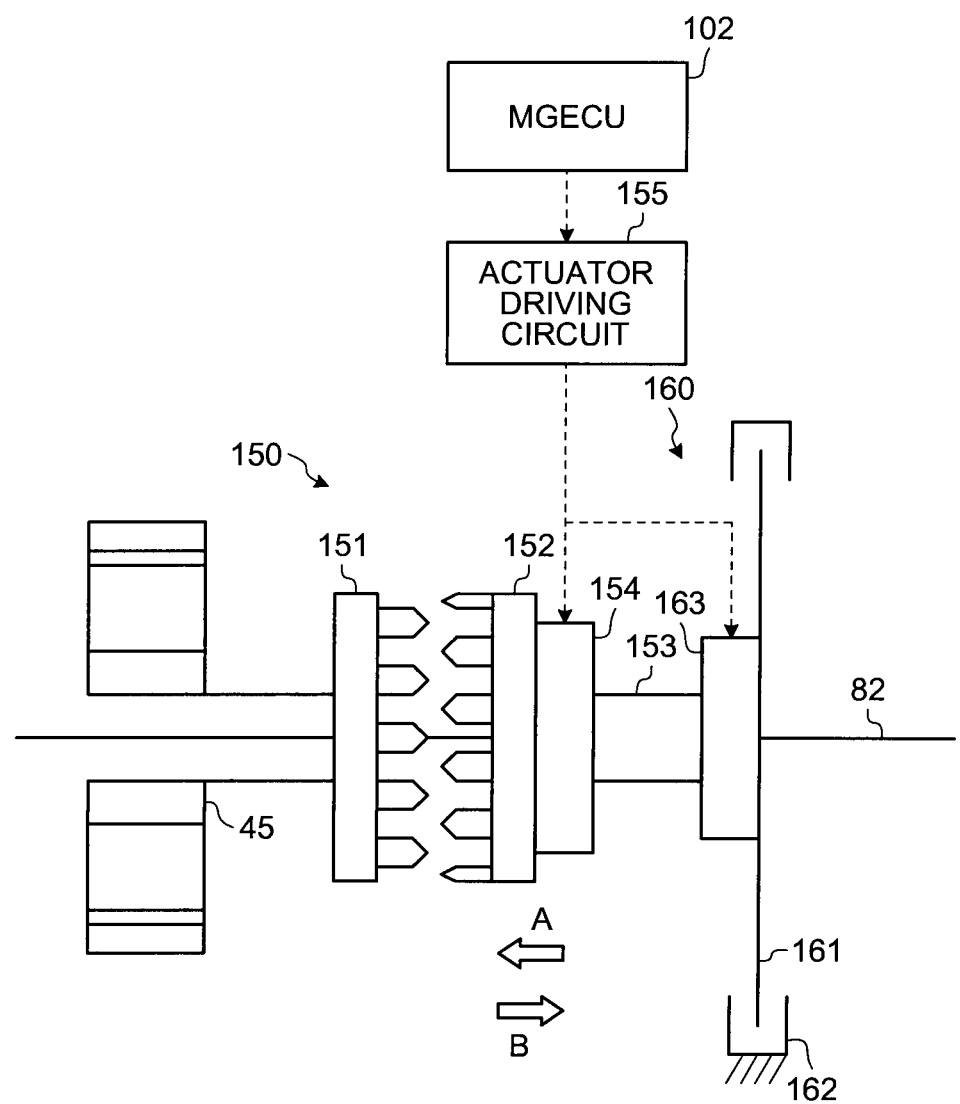
FIG. 22 is a diagram illustrating a dog clutch as another applicable clutch.

An example of a clutch of another form is a dog clutch 150, shown in FIG. 22, which has a gap between dog gears in the direction of rotation. This dog clutch 150 includes first and second dog gears 151 and 152 as a pair. The first and second dog gears 151 and 152 are concentrically disposed on the output shaft 82 and rotate around the output shaft 82 relative to each other. The first dog gear (first engaging member) 151 is connected to the sun gear 45 of the second planetary gear mechanism, serving as the fourth rotating element, and rotates integrally with this sun gear. On the other hand, the second dog gear (second engaging member) 152 includes a rotary shaft 153 connected to a brake 160, and is movable in the axial directions (indicated by arrows A and B). In this dog clutch 150, the second dog gear 152 is moved in the direction of the arrow A, and engaged with the first dog gear 151, thereby bringing about a clutch engaged state such that the first and second dog gears 151 and 152 integrally rotate. Additionally, in this dog clutch 150, the second dog gear 152 is moved in the direction of arrow B, and separated from the first dog gear 151, thereby bringing about a clutch released state (a clutch disengaged state) such that the first and second dog gears 151 and 152 integrally rotate. The second dog gear 152 is moved by driving a clutch driving means 154 serving as a coil unit provided with an electromagnetic coil. This clutch driving means 154 is operated by an actuator driving circuit 155 controlled by the MGECU 102.

The brake 160 fixes the sun gear 45 of the second planetary gear mechanism when the dog clutch 150 is in a clutch engaged state. The brake 160 is used when the brake operating state switches transmission mode from stepless to fixed transmission mode. This brake 160 includes: a rotary member 161, which rotates integrally with the rotary shaft 153 of the second dog gear 152; a holding member 162 fixed to an internal wall of the casing; and a brake operating means 163 for engaging or disengaging the rotary member 161 and the holding member 162. The brake operating means 163 has, for example, a coil unit identical to that in the clutch driving means 154, and is driven by the actuator driving circuit 155. This brake 160 engages the rotary member 161 and the holding member 162, thereby bringing about a brake operating state such that rotation of the dog clutch 150 relative to the output shaft 82 is stopped, and rotation of the sun gear 45 of the second planetary gear mechanism connected to the first dog gear 151 of the dog clutch 150 is also stopped. The brake operating means 163 of the brake 160 is operated by the actuator driving circuit 155 controlled by the MGECU 102.

To set continuously variable transmission ratio mode, the MGECU 102 puts the dog clutch 150 is in a clutch released state while the brake 160 is in a brake non-operating state. To set the fixed transmission ratio mode, on the other hand, the MGECU 102 puts the dog clutch 150 in a clutch engaged state while the brake 160 is in a brake operating state.

In order to apply this dog clutch 150 in the first to third embodiments, the engaging members 51 and 52 in each of the first to third embodiments are replaced by the first dog gear 151 and the second dog gear 152 respectively. The operation of the brake that includes the electromagnetic coil 55 and the holding means 56 is replaced by the operation of the brake 160 and the clutch driving means 154.

Figure 23:
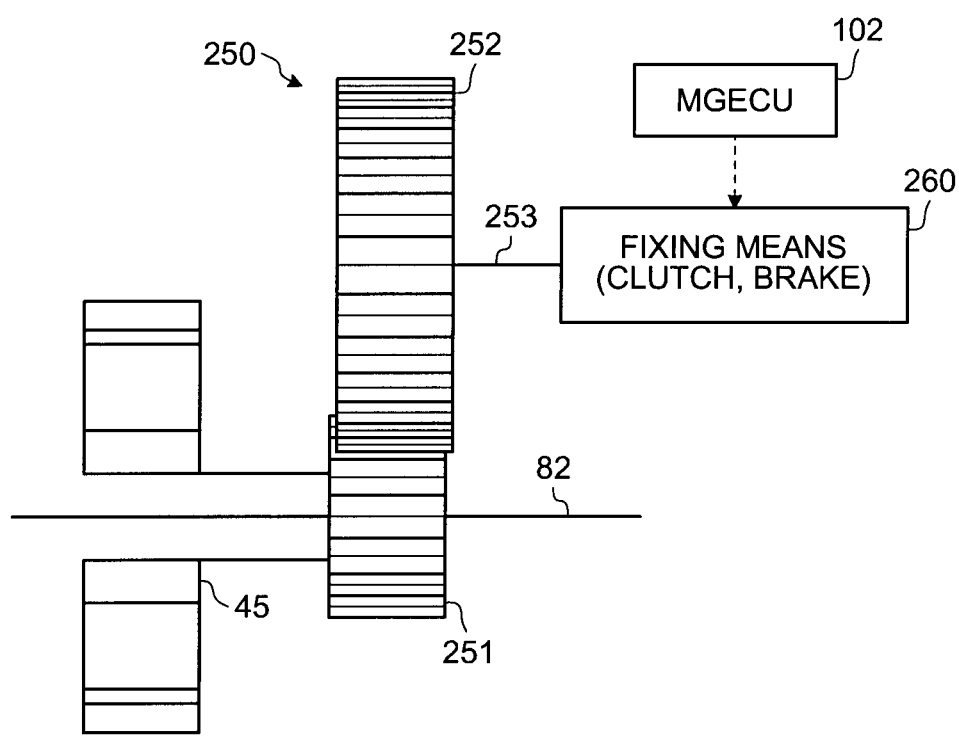
FIG. 23 is a diagram illustrating a geared clutch as another applicable clutch.

Furthermore, as a clutch of yet another form, a geared clutch 250 shown in FIG. 23 may be used, in which there is a slight gap between the teeth faces of the engaging gears. This geared clutch 250 includes: a first gear 251 (first engaging member) concentrically disposed on the output shaft 82; and a second gear 252 (second engaging member), serving as a reduction gear, which engages with the teeth faces of the first gear 251. The first gear 251 is rotated relative to the output shaft 82, is connected to the sun gear 45 of the second planetary gear mechanism, serving as the fourth rotating element, and rotates integrally with this sun gear 45. On the other hand, the second gear 252 has a rotary shaft 253 connected to a fixing means 260 provided for the clutch or brake, and is freely rotated or non-rotated around the rotary shaft 253 according to movement resulting from operation of the fixing means 260. The operation of the fixing means 260 is controlled by the MGECU 102.

In this geared clutch 250, by stopping rotation of the second gear 252, rotation of the first gear 251 also stops to bring about a clutch engaged state such that rotation of the sun gear 45 of the second planetary gear mechanism stops. Compared to this, in the geared clutch 250, the second gear 252 is freely rotated to bring about a clutch released state (clutch disengaged state) such that the first gear 251 rotates integrally with the sun gear 45. For transmission mode, fixed transmission ratio mode is set by exerting control such that this geared clutch 250 is put into a clutch engaged state, and continuously variable transmission ratio mode is set by exerting control such that this geared clutch 250 is put into a clutch released state.

In order to apply this geared clutch 250 in the first to third embodiments, the engaging members 51 and 52 in each of the first to third embodiments are replaced by the first gear 251 and the second gear 252 respectively. The operation of a brake that includes the electromagnetic coil 55 and the holding means 56 is replaced by operation of a fixing means 260.

Each of the control devices according to the first to third embodiments is configured so as to restrain or reduce shock or noise resulting from taking up of backlash in the clutch 50 when the direction of rotating torque acting on the first engaging member 51 is reversed. However, depending on the structure of the clutch (a transmission mode changing means), rotating torque may act on the second engaging member 52 as well, resulting in the rotating torque's reversing direction and hence taking up backlash in the clutch 50. Such a situation may occur, for example, when a certain power source is connected to the second engaging member 52. In this case, the control device in the first embodiment may exert control such that when the direction of rotating torque applied between the first and second engaging members 51 and 52 is reversed, backlash strike restraint rotating torque Tcmg 1 is applied to the engaging member (at least one of the first and second engaging members 51 and 52) on which the reversed rotating torque acts, and the magnitude of the rotating torque is decreased. The control device according to the second embodiment may exert control such that when the direction of rotating torque applied between the first and second engaging members 51 and 52 is reversed, electromagnetic attractive force acting on the engaging member other than that member (one of the first and second engaging members 51 and 52) on which reversed rotating torque acts, is decreased. The control device in the third embodiment may exert control such that when the direction of rotating torque applied between the first and second engaging members 51 and 52 is reversed, backlash take-up inhibition rotating torque Tcmg 2 is applied to that member (at least one of the first and second engaging members 51 and 52) on which the reversed rotating torque acts, thereby restraining relative rotation of the first and second engaging members 51 and 52.

In the control device in each of the first to third embodiments described above, the backlash strike restraint rotating torque Tcmg 1 and the backlash take-up inhibition rotating torque Tcmg 2 are generated using torque (motor torque or generator torque) output from the first motor/generator 20. However, instead of this torque (motor torque or generator torque), the backlash strike restraint rotating torque Tcmg 1 and the backlash take-up inhibition rotating torque Tcmg 2 may be generated using torque output from the engine 10 or using torques output from both the first motor/generator 20.

In the control device in each of the first to third embodiments described above, a hybrid vehicle 1 is used as an example. However, these control devices can be effectively used in, for example, an electric vehicle in which the engine 10 is replaced by a motor, a generator, or a motor/generator. Additionally, these control devices may be used for a vehicle using a first motor/generator 20 as a power source, which is actualized by omitting the second motor/generator 30 from the hybrid vehicle 1 exemplified in each of the first to third embodiments. However, these control devices may be used in a vehicle on condition that they are used only to modify transmission ratio in continuously variable transmission.

INDUSTRIAL APPLICABILITY

The control device of a vehicles according to the present invention are provided for a mechanism that switches between fixed transmission ratio mode and continuously variable transmission ratio mode and that has backlash in the rotary direction thereof, the apparatuses being useful as a technology for restraining or reducing shock or noise resulting from backlash taken up when the direction of the rotating torque acting on the mechanism and its rotating elements is reversed.

REFERENCE SIGNS LIST

- 1 Hybrid Vehicle
- 10 Engine
- 20 First Motor/Generator
- 30 Second Motor/Generator
- 40 Power Dividing Mechanism
- 50 Clutch
- 51 First Engaging Member
- 52 Second Engaging Member
- 53 Cam
- 54 Cam Groove
- 55 Electromagnetic Coil
- 91 Inverter
- 95 Accelerator Displacement Amount Detecting Means
- 150 Dog Clutch
- 151 First Dog Teeth (First Engaging Member)
- 152 Second Dog Teeth (Second Engaging Member)
- 154 Clutch Driving Means
- 155 Actuator Driving Circuit
- 160 Brake
- 161 Rotary Member
- 162 Holding Member
- 163 Brake Operating Means
- 250 Geared Clutch
- 251 First Gear (First Engaging Member)
- 252 Second Gear (Second Engaging Member)
- 216 Fixing Means
- 101 Engine ECU
- 102 MGECU
- 103 Transmission ECU
- 104 HVECU
- WL, WR, Driving Wheel

The invention claimed is:

1. A control device of a vehicle comprising:
   a transmission mechanism that includes a plurality of rotating elements rotated by torque output and transmitted from a plurality of power sources, and that switches a transmission mode according to engaging states of the respective rotating elements; and
   a transmission mode changing unit that includes a first engaging member and a second engaging member having a backlash between them in a rotating direction thereof, and that alters the transmission mode to a fixed transmission ratio mode by engaging the first engaging member, connected to one of the rotating elements, with the second engaging member, and alters the transmission mode to a continuously variable transmission ratio mode by releasing the engagement, wherein
   when a direction of rotating torque acting on the first engaging member is reversed, rotation restraining torque is generated at the first engaging member by using torque output from at least one of the power sources until the backlash has been completely taken up as the direction is reversed, the rotation restraining torque being against, in reverse direction to, and smaller in absolute value than the reversed rotating torque acting on the first engaging member.

2. The control device of a vehicle according to claim 1, wherein
   when the transmission mode changing unit includes an electromagnetic attractive force generating unit that stops rotation of the second engaging unit by use of electromagnetic attractive force, the rotation of the second engaging member is permitted by reducing electromagnetic attractive force generated by the electromagnetic attractive force generating unit, if a direction of rotating torque applied to the first engaging member is reversed.

3. The control device of a vehicle according to claim 1, wherein, when a motor, a generator, or a motor/generator is provided as the power source, the rotation restraining torque is generated using torque output from the motor, generator, or motor/generator.

4. The control device of a vehicle according to claim 3, wherein
   when the transmission mode changing unit includes an electromagnetic attractive force generating unit that stops rotation of the second engaging unit by use of electromagnetic attractive force, the rotation of the second engaging member is permitted by reducing electromagnetic attractive force generated by the electromagnetic attractive force generating unit, if a direction of rotating torque applied to the first engaging member is reversed.

5. A control device of a vehicle comprising:
   a transmission mechanism that includes a plurality of rotating elements rotated by torque output and transmitted from a plurality of power sources, and that switches a transmission mode according to engaging states of the respective rotating elements; and
   a transmission mode changing unit that includes a first engaging member and a second engaging member having a backlash between them in a rotating direction thereof, and that alters the transmission mode to a fixed transmission ratio mode by engaging the first engaging member, connected to one of the rotating elements, with the second engaging member, and alters the transmission mode to a continuously variable transmission ratio mode by releasing the engagement, wherein
   when a direction of rotating torque acting on the first engaging member is reversed, rotation inhibition torque is generated at the first engaging member by using torque output from at least one of the power sources, the rotation inhibition torque being against, in reverse direction to, and greater in absolute value than the reversed rotating torque acting on the first engaging member, and when the direction of the reversed rotating torque is reversed yet again, the rotation inhibition torque is gradually reduced after a predetermined time has elapsed.

6. The control device of a vehicle according to claim 5, wherein, when a motor, a generator, or a motor/generator is provided as the power source, the rotation restraining torque is generated using torque output from the motor, generator, or motor/generator.

7. A control device of a vehicle comprising:
a transmission mechanism that includes a plurality of rotating elements rotated by torque output and transmitted from a plurality of power sources, and that switches a transmission mode according to engaging states of the respective rotating elements; and
a transmission mode changing unit that includes a first engaging member and a second engaging member having a backlash between them in a rotating direction thereof, and that alters the transmission mode to a fixed transmission ratio mode by engaging the first engaging member, connected to one of the rotating elements, with the second engaging member, and alters the transmission mode to a continuously variable transmission ratio mode by releasing the engagement, wherein
when a direction of rotating torque acting on the first engaging member is reversed, switching among first control, second control, and third control is carried out, the first control being such that rotation restraining torque is applied to the first engaging member by using torque output from at least one of the power sources, according to a returning speed of an accelerator pedal or deceleration of an accelerator opening degree, the rotation restraining torque being against, in reverse direction to, and smaller in absolute value than the reversed rotating torque acting on the first engaging member,
the second control being such that, when the reversed rotating torque is acting on the first engaging member, rotation of the second engaging member is permitted by reducing electromagnetic attractive force of an electromagnetic attractive force generating unit that stops rotation of the second engaging member, and
the third control being such that rotation inhibiting torque is applied to the first engaging member by using torque output from at least one of the power sources, the rotation inhibition torque being against, in reverse direction to, and greater in absolute value than the reversed rotating torque acting on the first engaging member.

8. The control device of a vehicle according to claim 7, wherein the third control is exerted when the returning speed of the accelerator pedal or the deceleration of the accelerator opening degree is greater than a threshold value, and the first or second control is exerted when a predetermined time has elapsed without the accelerator pedal being pressed after that or when the braking operation is carried out.

* * * * *